(12) United States Patent
Hsu et al.

(10) Patent No.: US 10,659,576 B1
(45) Date of Patent: May 19, 2020

(54) OUTWARD-FOLDING DISPLAY DEVICE HAVING HINGE UNITS

(71) Applicant: FOSITEK CORPORATION, New Taipei (TW)

(72) Inventors: An-Szu Hsu, New Taipei (TW); Yang-Zhong Wu, Shenzhen (CN); Yan-Jiao Cheng, Shenzhen (CN)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 16/654,884

(22) Filed: Oct. 16, 2019

(30) Foreign Application Priority Data

Jul. 10, 2019 (CN) ............................ 2019 1 0621459
Jul. 10, 2019 (CN) ...................... 2019 2 1079361 U

(51) Int. Cl.
*H04M 1/02* (2006.01)
*G06F 1/16* (2006.01)

(52) U.S. Cl.
CPC .......... *H04M 1/022* (2013.01); *G06F 1/1616* (2013.01); *G06F 1/1624* (2013.01); *G06F 1/1652* (2013.01); *G06F 1/1681* (2013.01); *H04M 1/0268* (2013.01)

(58) Field of Classification Search
CPC ... H04M 1/022; H04M 1/0268; G06F 1/1616; G06F 1/1624; G06F 1/1652; G06F 1/1681
See application file for complete search history.

(56) References Cited

U.S. PATENT DOCUMENTS

| 9,874,048 B1 * | 1/2018 | Hsu ..................... E05D 11/1028 |
| 9,874,906 B1 * | 1/2018 | Hsu ......................... G06F 1/1681 |
| 2017/0357289 A1 * | 12/2017 | Ahn .................... H04M 1/0268 |
| 2019/0103656 A1 * | 4/2019 | Shi ........................ G06F 1/1618 |

* cited by examiner

*Primary Examiner* — Nguyen T Vo
(74) *Attorney, Agent, or Firm* — Birch, Stewart, Kolasch & Birch, LLP

(57) ABSTRACT

An outward-folding display device includes two flat casings adapted to be connected to a flexible display, and two hinge units connected between the casings such that the casings are convertible between unfolded and folded positions. Each of the hinge units includes two rotatable drive shafts, and two compensation subunits each including a rotating plate that is co-rotatably connected to a respective one of the drive shafts, and a driven plate that is slidable relative to the rotating plate and that is connected to a respective one of the casings, such that during conversion of the casings, the driven plate and the respective one of the casings slide relative to the rotating plate to prevent the flexible display from being stretched and damaged.

13 Claims, 29 Drawing Sheets

OUTWARD-FOLDING DISPLAY DEVICE HAVING HINGE UNITS

CROSS-REFERENCE TO RELATED APPLICATION

This application claims priority of Chinese Patent Application Nos. 201910621459.6 and 201921079361.4, filed on Jul. 10, 2019.

FIELD

The disclosure relates to a display device, and more particularly to an outward-folding display device.

BACKGROUND

Foldable smartphones are mainly divided into two groups: inward-folding smartphones and outward-folding smartphones. When folded, a flexible display for an inward-folding smartphone is located on the interior thereof, and the flexible display for an outward-folding smartphone is wrapped around the exterior thereof. Since the outward-folding smartphone is designed to allow a user to interact with the display when folded, it is generally more popular than its counterpart.

However, in a folding process of a conventional outward-folding smartphone, since a distance between a rotating shaft of the smartphone and a distal edge of the flexible display in a thickness direction is slightly larger than a distance between the rotating shaft and a distal edge of a casing of the smartphone in the thickness direction, the flexible display is subject to tension which may cause damage to the flexible display. In other cases, the middle of the flexible display suffers from insufficient support from the rotating shaft and is thus prone to damage.

SUMMARY

Therefore, the object of the disclosure is to provide an outward-folding display device that can alleviate at least one of the drawbacks of the prior art.

According to the disclosure, an outward-folding display device is adapted to be connected to a flexible display. The outward-folding display device includes a casing unit and two hinge units.

The casing unit includes two flat casings that are arranged in a lengthwise direction. Each of the casings has a folding surface and is adapted to be connected to the flexible display.

The hinge units are spaced apart in a width direction that is perpendicular to the lengthwise direction, and are connected between the casings such that the casings are convertible between an unfolded position, where the folding surfaces of the casings are coplanar and are perpendicular to a height direction which is perpendicular to the lengthwise and width directions, and a folded position, where the folding surfaces are facing toward each other and are perpendicular to the lengthwise direction.

Each of the hinge units includes a shaft holder, two drive shafts, a synchronizer, a flexible connection subunit and two compensation subunits.

The shaft holder has a connecting portion extending in the width direction, two pivot block portions connected to the connecting portion and spaced apart along a first axis in the width direction, and two bushing portions connected to the connecting portion and spaced apart in the width direction along a second axis.

The drive shafts are spaced apart in the lengthwise direction. Each of the drive shafts extends through the bushing portions of the shaft holder along a shaft axis that extends in the width direction, is rotatable about the shaft axis, and has a driving portion and a syncing portion that is formed with a guiding groove extending helically about the shaft axis. The guiding grooves of the drive shafts are symmetrical with each other.

The synchronizer is clamped between the syncing portions of the drive shafts, and has two guiding blocks engaged respectively and symmetrically with the guiding grooves of the syncing portions of the drive shafts so that the rotations of the drive shafts about the shaft axes are synchronized and are respectively in opposite directions.

The flexible connection subunit is connected between the pivot block portions of the shaft holder, and has two connecting ends. A length of the connection subunit is maintained constant.

The compensation subunits are opposite to each other in the lengthwise direction. Each of the compensation subunits includes a rotating plate, a crank member, a driving plate and a driven plate.

The rotating plate has a rotating plate portion and two guiding protrusions. The rotating plate portion is connected co-rotatably to the driving portion of a respective one of the drive shafts, and has opposite first and second surfaces, a first outer edge, a circular-sector-shaped crank recess, a pin hole and an arc-shaped slot.

The first and second surfaces are respectively distal from and proximate to the folding surface of a respective one of the casings. The first outer edge is distal from the driving portion of the respective one of the drive shafts and extends in the width direction. The crank recess is formed in the first surface and has an arc end. The pin hole and the arc-shaped slot are respectively distal from and proximate to the arc end of the crank recess and extend from the crank recess through the second surface. The arc-shaped slot has an unfolded end section and a folded end section. The guiding protrusions are connected to opposite ends of the plate portion in the width direction.

The driving plate is slidably connected to the first surface of the rotating plate, is connected to a respective one of the connecting ends of the connecting subunit, and has a driving slot and a second outer edge. The driving slot is in spatial communication with the crank recess of the rotating plate. The second outer edge is distal from the respective one of the connecting ends of the connecting subunit, and is parallel to the first outer edge of the rotating plate.

The driven plate has a driven plate portion and two spaced-apart track block portions. The driven plate portion is slidably connected to the second surface of the rotating plate, is co-movably connected to the respective one of the casings, and has a driven slot in spatial communication with the arc-shaped slot. The track block portions are connected to the driven plate portion, and are respectively formed with two track grooves. The guiding protrusions of the rotating plate engage slidably and respectively the track grooves.

The crank member is received in the crank recess, and has a driving pin, a driven pin and a rotating pin. The driving pin slidably engages the driving slot of the driving plate. The driven pin slidably extends through the arc-shaped slot of the rotating plate and slidably engages the driven slot of the driven plate. The rotating pin rotatably engages the pin hole. The driving pin and the driven pin are respectively proximate to and distal from the rotating pin.

When the casings are converted from the unfolded position to the folded position, the driving plate slides relative to the rotating plate by a first predetermined final distance and cooperates with the rotating plate to drive the crank member to rotate in the rank recess about the rotating pin relative to the rotating plate, thereby causing the driven pin to slide from the unfolded end section to the folded end section, and driving the driven plate and the respective one of the casings to cooperatively move by a second predetermined final distance relative to the rotating plate which is larger than the first predetermined final distance.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
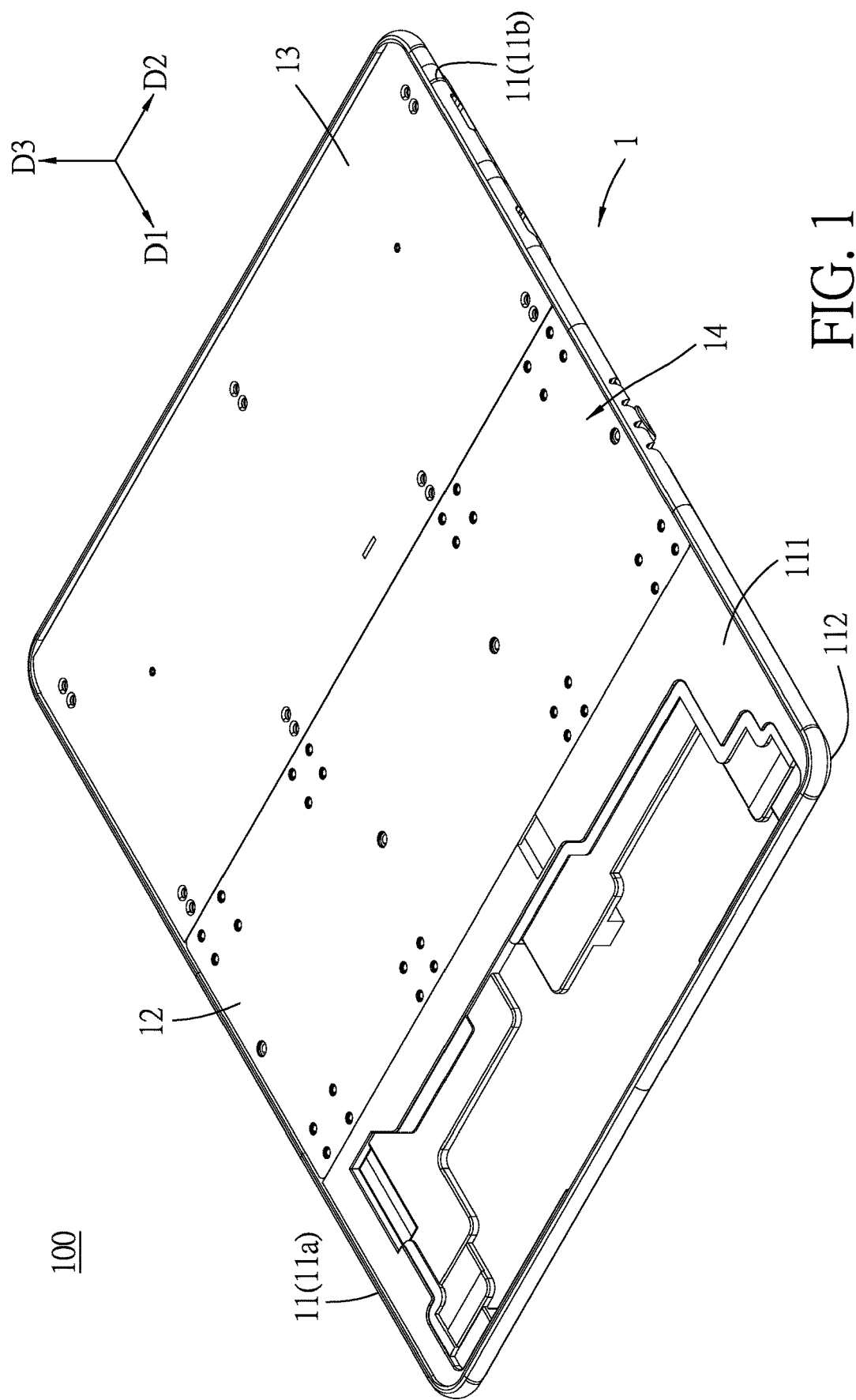
FIG. 1 is a perspective view of an embodiment of an outward-folding display device according to the disclosure, illustrating two casings of a casing unit in an unfolded position.
Figure 2:
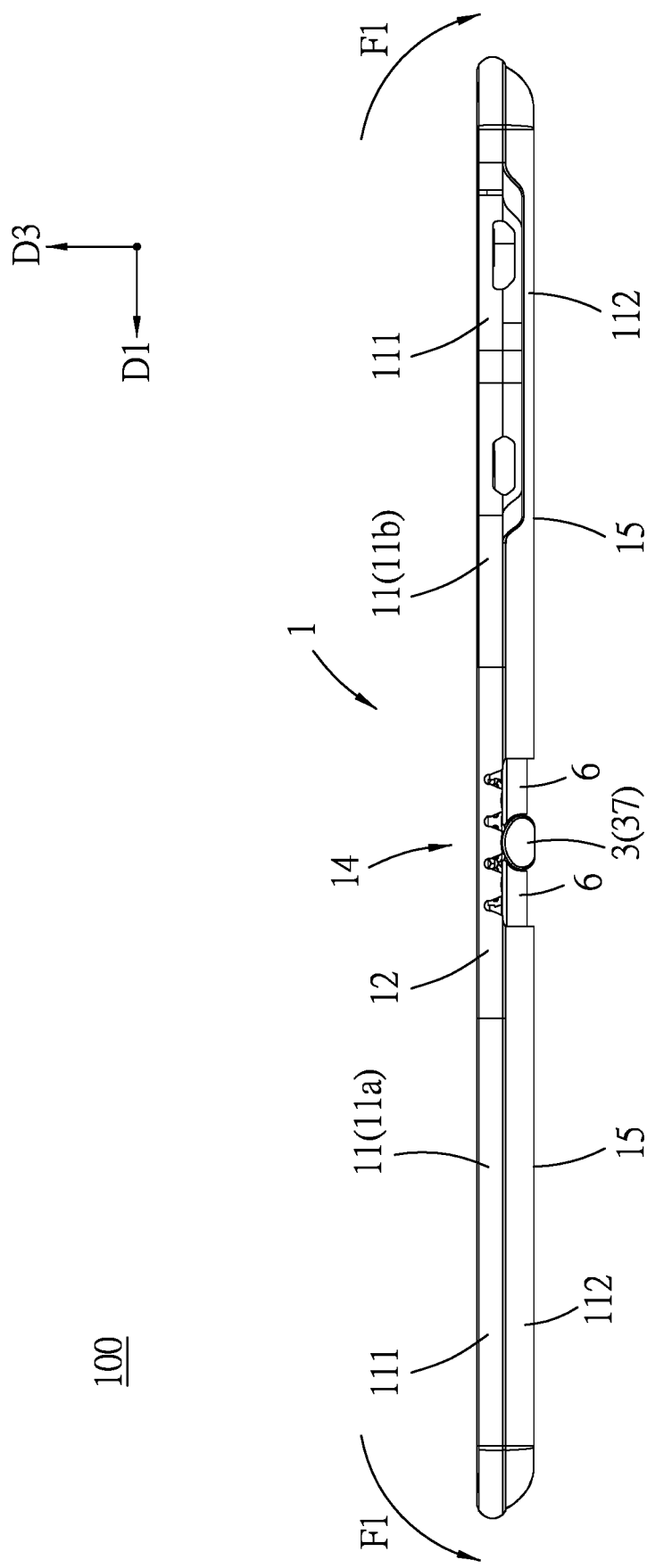
FIG. 2 is a side view of the embodiment, illustrating two block boards being exposed from a gap between the casings when the casings are in the unfolded position.
Figure 3:
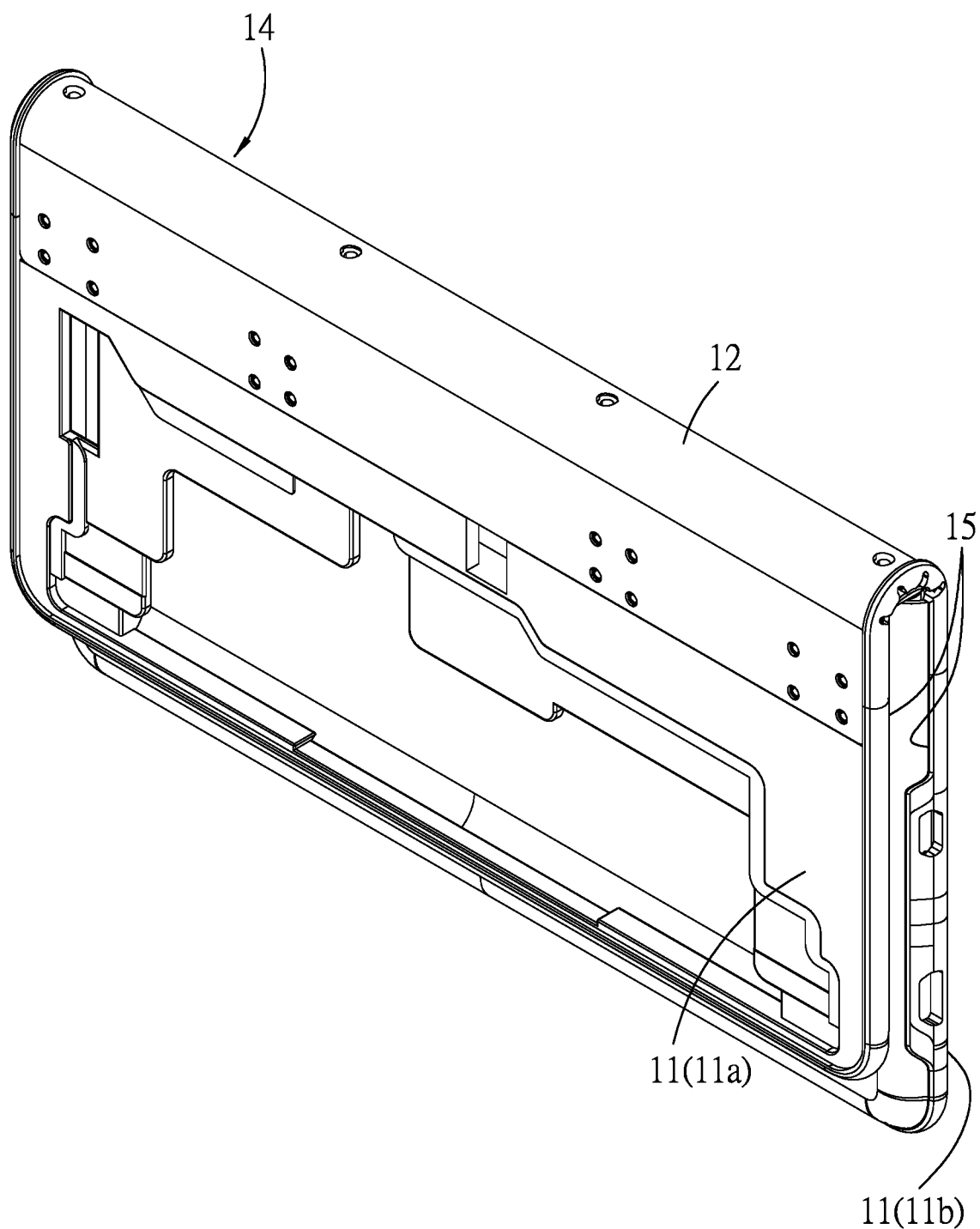
FIG. 3 is a perspective view of the embodiment, illustrating the casings in a folded position.
Figure 4:
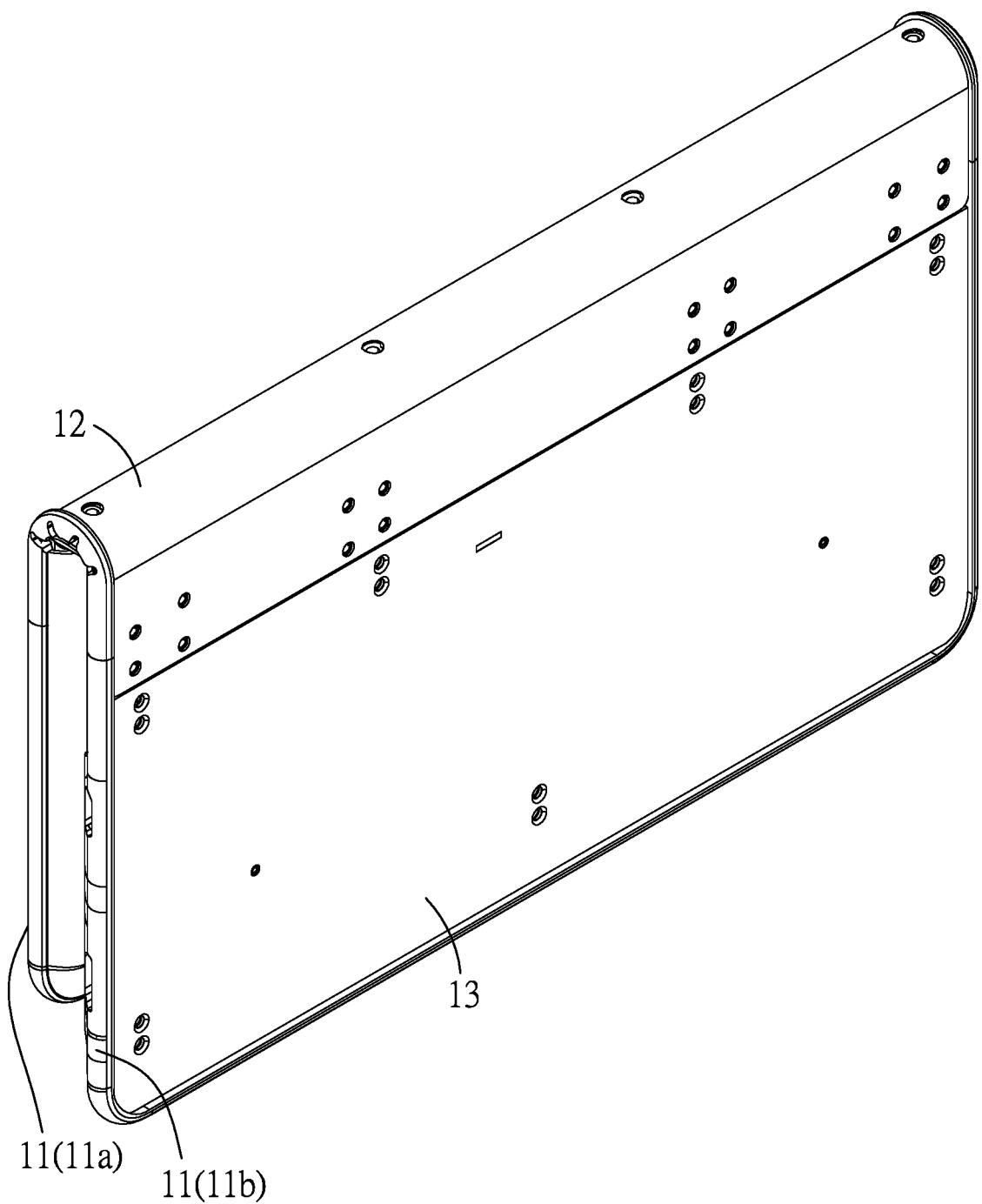
FIG. 4 is another perspective view of the embodiment, illustrating the casings in the folded position.
Figure 5:
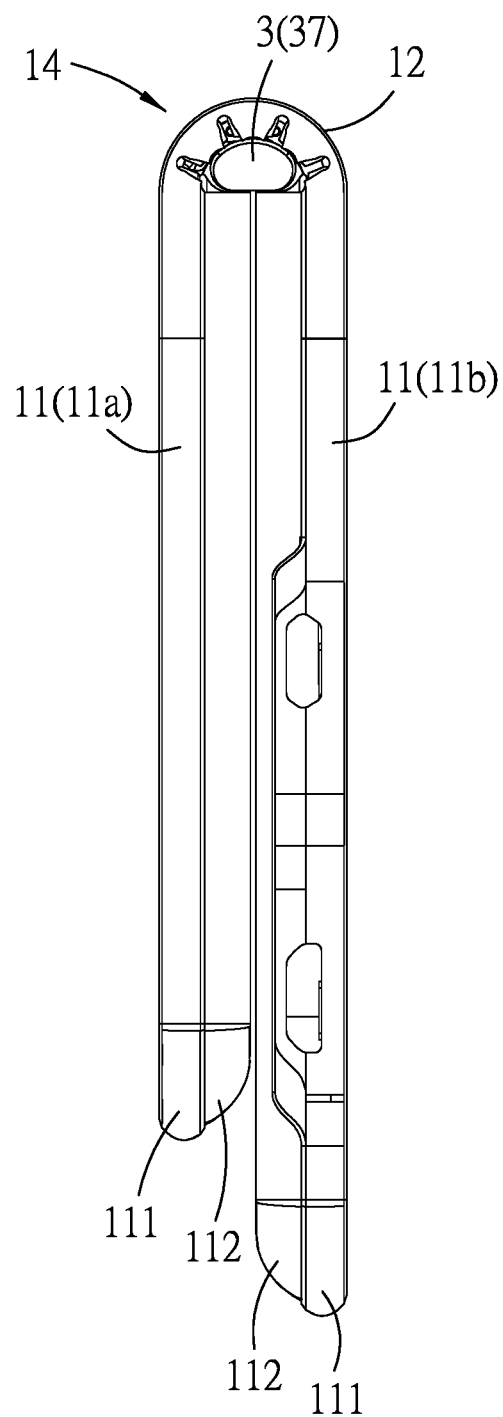
FIG. 5 is a side view of the embodiment, illustrating the casings in the folded position.

Referring to FIGS. 1 to 5, an embodiment of an outward-folding display device 100 according to the disclosure is adapted to be connected to a flexible display (not shown), and is convertible between an unfolded state (see FIGS. 1 and 2) and a folded state (see FIGS. 3, 4 and 5). In the present embodiment, the word "flexible" refers to the mechanical property of a material that is bendable within a specific range under external forces without breaking, and yet is not extendable in length or width.

Figure 6:
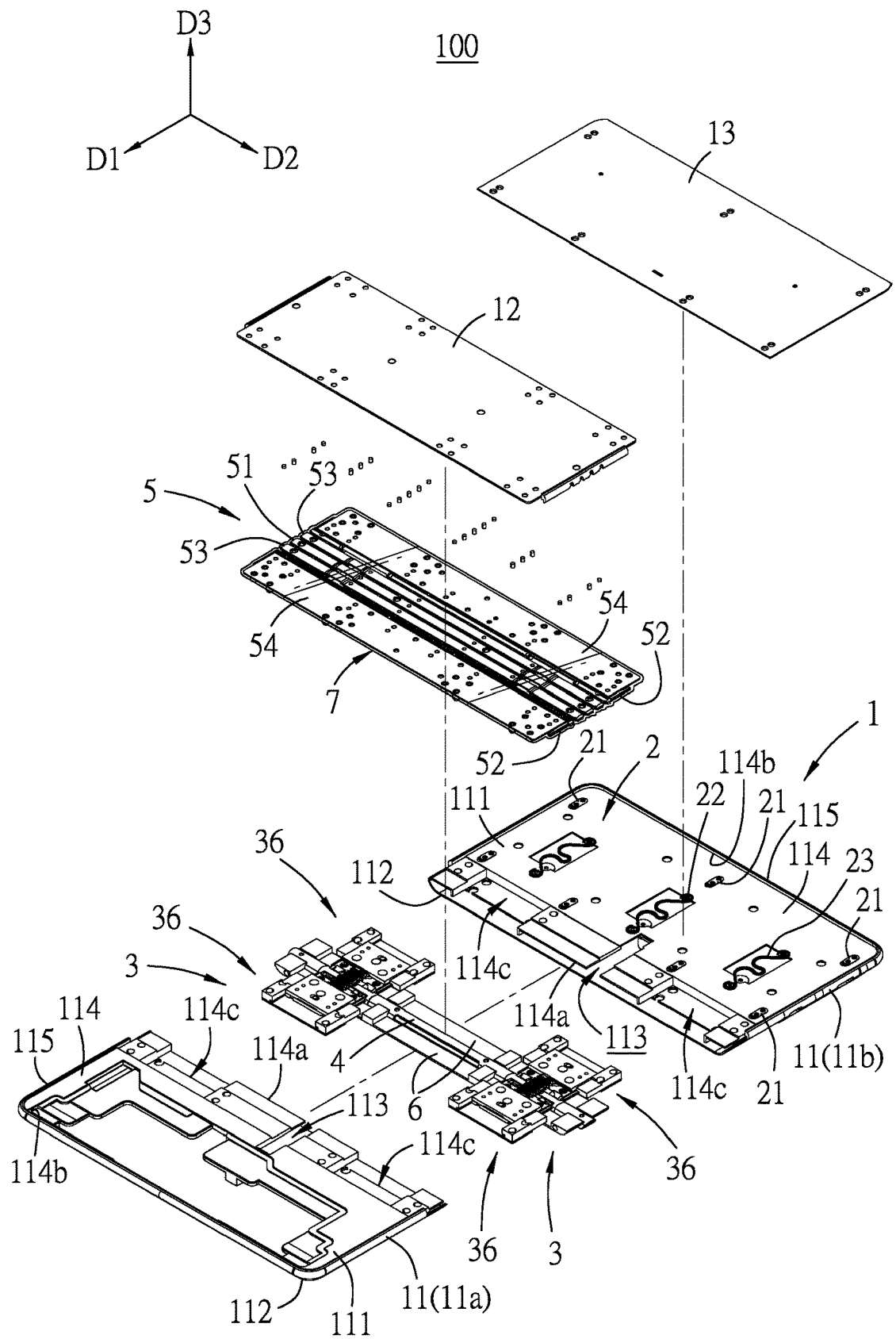
FIG. 6 is a partly exploded perspective view of the embodiment.
Figure 7:
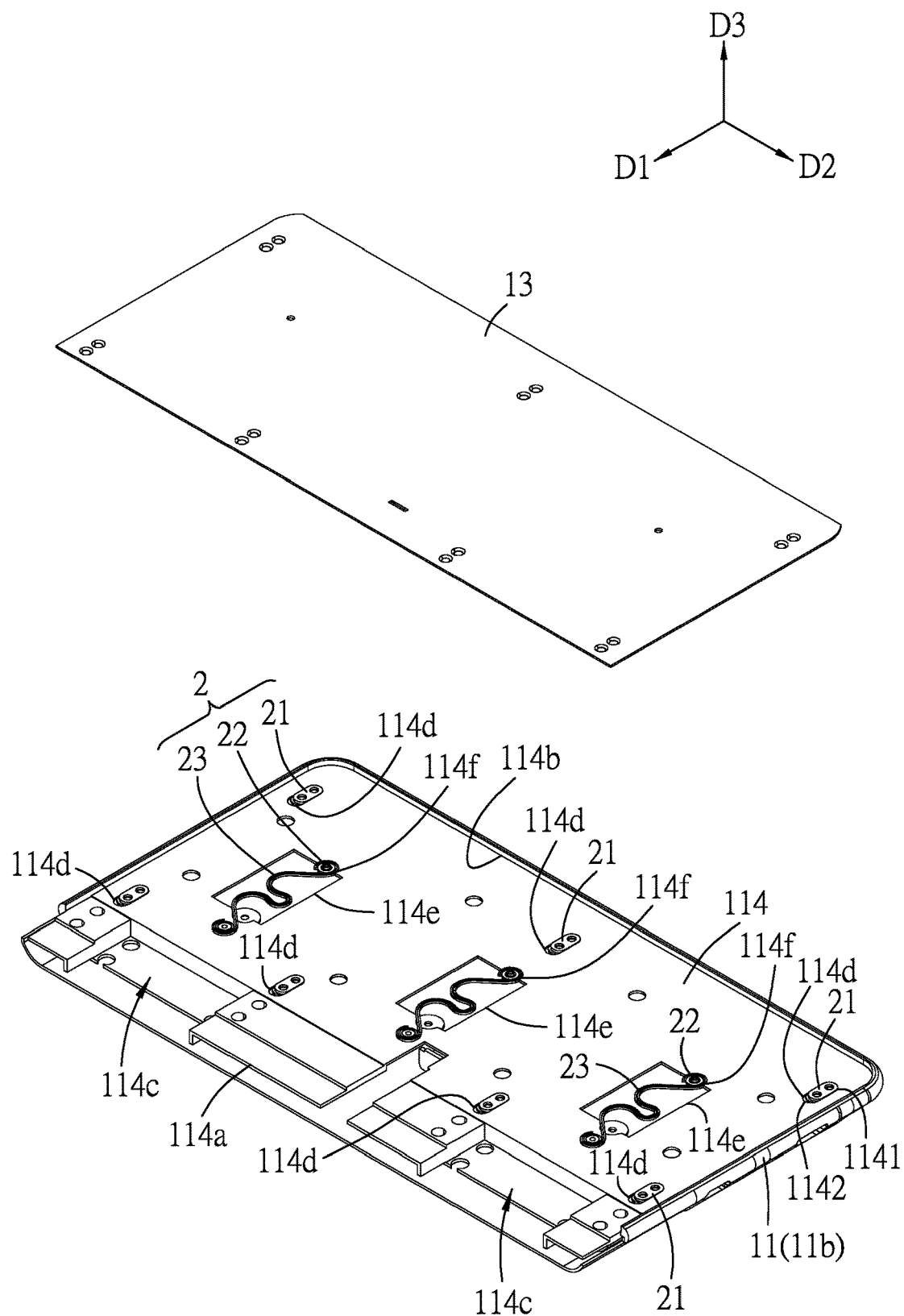
FIG. 7 is a partly exploded and fragmentary perspective view of the embodiment, illustrating one of the casings, a sliding board of the casing unit and a display protection module of the embodiment.

Referring further to FIGS. 6 and 7, the outward-folding display device 100 includes a casing unit 1, a display protection module 2, two hinge units 3, a connecting tube 4, a support unit 5 and two block boards 6.

The casing unit 1 includes two flat casings 11 that are arranged in a lengthwise direction (D1), and that are adapted to be connected to the flexible display.

In the present embodiment, the two casings 11 include a first casing 11a and a second casing 11b. Each of the first and second casings 11a, 11b includes a first casing member 111 and a second casing member 112 that are connected together. The first casing member 111 of each of the first and second casings 11a, 11b is formed with a mounting space 113, such that a plurality of electronic components (not shown) may be mounted therein. Specifically, the electronic components, which are electrically connected to the flexible display, are mounted in the mounting space 113 of the first casing member 111 of each of the first and second casings 11a, 11b before the first and second casing members 111, 112 of each of the casings 11 are connected together during a manufacturing process of the outward-folding display device 100.

However, in other variations of the embodiment, each of the first and second casings 11a, 11b may be formed integrally as one piece.

In the present embodiment, the first casing member 111 includes a base wall 114, and a surrounding wall 115 extending from a periphery of the base wall 114. The second casing member 112 is connected to the surrounding wall 115 of the first casing member 111, and has a folding surface 15 which is opposite to the flexible display. The base wall 114 has a first edge 114a and a second edge 114b that are disposed respectively at opposite sides of the folding surface 15, and is formed with two connecting indentations 114c that are arranged along the first edge 114a.

The case unit 1 further includes a flexible casing board 12 and a sliding board 13. The casing board 12 is connected between the first and second casings 11a, 11b and covers the hinge units 3. The sliding board 13 is disposed on and slidably mounted to the base wall 114 of the second casing 11b. The base wall 114 of the first casing 11a is configured to be disposed closer to the flexible display than the base wall 114 of the second casing 11b is, and the base wall 114 of the first casing 11a, the casing board 12 and the sliding board 13 cooperatively define a display surface 14 that is adapted to be connected to the flexible display. Specifically, with the flexible display being connected to the sliding board 13 which is slidable relative to the second casing 11b, the flexible display is also slidable relative to the second casing 11b.

The second casing 11b further has a plurality of buffer slots 114d, a plurality of cut-out sections 114e and a plurality of limiting holes 114f.

The buffer slots 114d are formed in the base wall 114 of the second casing 11b, and are arranged along two imaginary parallel lines that are respectively proximate to the first and second edges 114a, 114b of the base wall 114 of the second casing 11b. Each of the buffer slots 114d has a default end 1141 and a buffer end 1142 that are opposite to each other, and that are respectively distal from and proximate to the first edge 114a of the base wall 114. The cut-out sections 114e are formed in the base wall 114 of the second casing 11b and are disposed between the abovementioned two imaginary parallel lines. The limiting holes 114f are respectively in spatial communication with the cut-out sections 114e.

Referring to FIG. 7, the display protection module 2 is mounted in the second casing 11b of the case unit 1, and includes a plurality of buffer blocks 21, a plurality of linking blocks 22 and a plurality of resilient members 23.

The buffer blocks 21 slidably and respectively engage the buffer slots 114d of the second casing 11b, and are connected to the sliding board 13. The linking blocks 22 are disposed respectively in the limiting holes 114f, and are connected to the sliding board 13. Each of the resilient members 23 is mounted on a respective one of the cut-out sections 114e of the second casing 11b, and has opposite ends that are connected respectively to the second casing 11b and the sliding board 13 via a respective one of the linking blocks 22. In other words, each of the linking blocks 22 interconnects a respective one of the resilient members 23 and the sliding board 13.

In the present embodiment, the resilient members 23 are pre-compressed before being mounted on the cut-out sections 114e of the base wall 114 of the second casing 11b, and are capable of biasing the sliding board 13 toward the second edge 114b of the base wall 114 when each of the buffer blocks 21 is moved from the default end 1141 toward the buffer end 1142 of a respective one of the buffer slots 114d of the second casing 11b. In virtue of the above-mentioned configurations of the sliding board 13 and the display protection module 2, the flexible display is protected from being damaged by unexpected pulling as a result of malfunction of the outward-folding display device 100. Further details regarding this feature will be described later.

Referring to FIG. 6, the hinge units 3 are spaced apart in a width direction (D2) that is perpendicular to the lengthwise direction (D1), and are connected between the first and second casings 11a, 11b. Specifically, for the base wall 114 of each of the first and second casings 11a, 11b, the connecting indentations 114c of the base wall 114 are respectively engaged with the hinge units 3, and the first edge 114a is connected to the hinge units 3, such that the first and second casings 11a, 11b are convertible between an unfolded position (see FIGS. 1 and 2) and a folded position (see FIGS. 3, 4 and 5).

When the first and second casings 11a, 11b are in the unfolded position, the folding surfaces 15 of the first and second casings 11a, 11b are coplanar and are perpendicular to a height direction (D3) which is perpendicular to the lengthwise and width directions (D1, D2). When the first and second casings 11a, 11b are in the folded position, the folding surfaces 15 of the first and second casings 11a, 11b face toward each other and are perpendicular to the lengthwise direction (D1).

Referring to FIGS. 8 to 12, each of the hinge units 3 includes a shaft holder 31, two drive shafts 32, a synchronizer 33, a plurality of torsion plates 34, a flexible connection subunit 35, two compensation subunits 36 and a shaft cap 37. Since the two hinge units 3 are symmetrical in the width direction (D2) in the present embodiment, for the sake of brevity, only one of the hinge units 3 is described in details in the following paragraphs.

The shaft holder 31 has a connecting portion 311 extending in the width direction (D2), two pivot block portions 313 connected to the connecting portion 311 and spaced apart in the width direction (D2) along a first axis (L1), and two bushing portions 312 connected to the connecting portion 311 and spaced apart in the width direction (D2) along a second axis (L2).

The drive shafts 32 are spaced apart in the lengthwise direction (D1). Each of the drive shafts 32 extends through the bushing portions 312 of the shaft holder 31 along a shaft axis (X) that extends in the width direction (D2), and is rotatable about the shaft axis (X).

Figure 14:
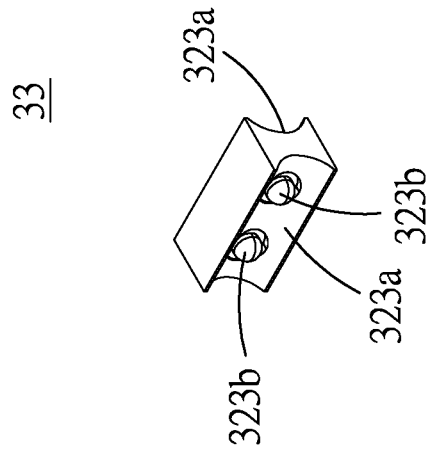
FIG. 14 is a perspective view of a synchronizer of the one of the hinge units.
Figure 13:
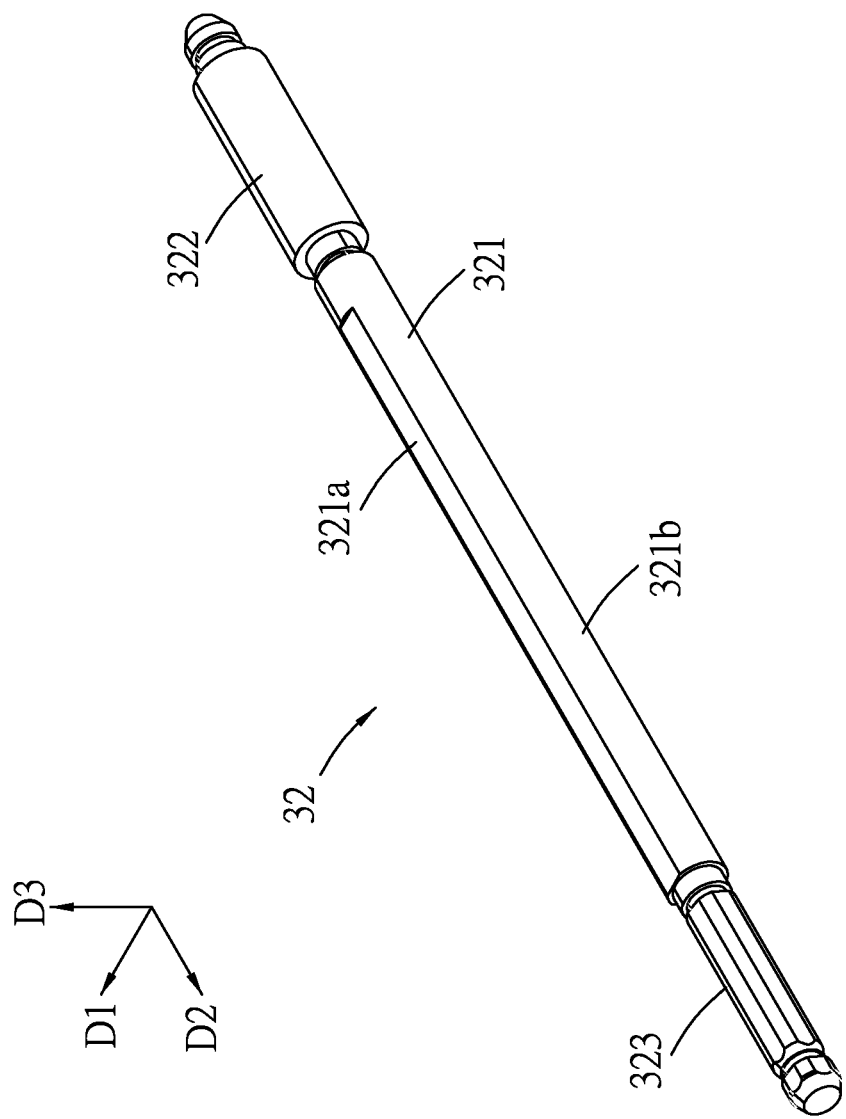
FIG. 13 is another perspective view of the drive shaft.
Figure 15:
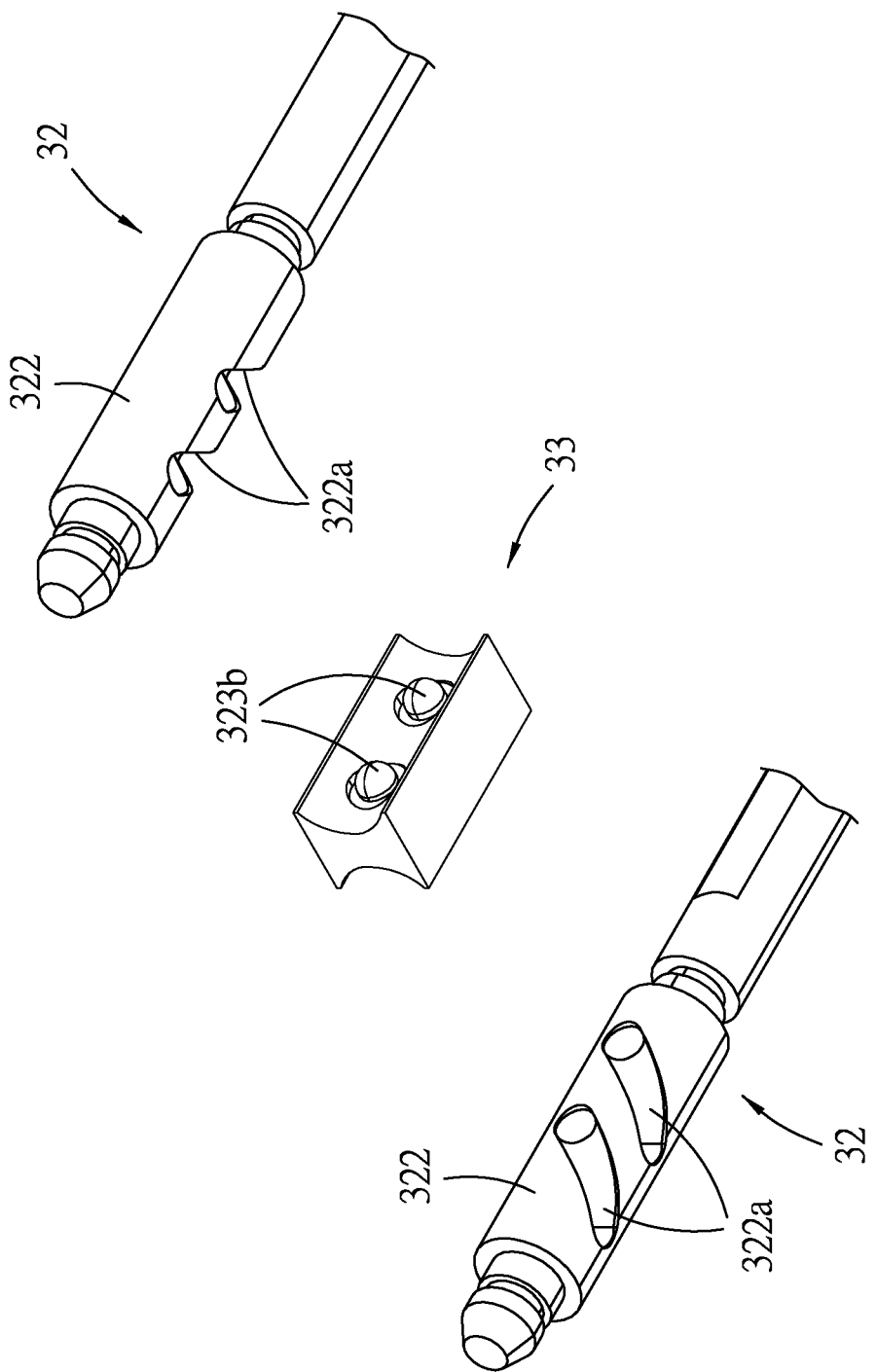
FIG. 15 is a fragmentary exploded perspective view of the one of the hinge units, illustrating two syncing portions of two drive shafts and the synchronizer.

Referring further to FIGS. 13 to 15, each of the drive shafts 32 has a driving portion 321, a syncing portion 322, and an extending portion 323.

For each of the drive shafts 32, the syncing portion 322 and the extending portion 323 are connected respectively to opposite ends of the driving portion 321 in the width direction (D2). The driving portion 321 is disposed between the bushing portions 312 of the shaft holder 31, and has an outer surrounding surface that surrounds the shaft axis (X) and that has two flat surface sections 321a and a curved surface section 321b. The flat surface sections 321a are perpendicular to each other and are connected to the curved surface section 321b. The extending portion 323 has a polygonal cross section. In this embodiment, the syncing portion 322 is formed with two guiding grooves 322a that extend helically about the shaft axis (X), and the two guiding grooves 322a of one of the drive shafts 32 are symmetrical with those of the other one of the drive shafts 32 (see FIG. 15).

The synchronizer 33 is clamped between the syncing portions 322 of the drive shafts 32, and has two concave surfaces 323a and four guiding blocks 323b. The concave surfaces 323a are formed symmetrically on opposite ends of the synchronizer 33. The guiding blocks 323b are evenly distributed on the opposite ends of the synchronizer 33, protrude from the concave surfaces 323a, and are engaged respectively and symmetrically with the guiding grooves 322a of the syncing portions 322 of the drive shafts 32 so that the rotations of the drive shafts 32 about the shaft axes (X) are synchronized and are respectively in opposite directions. It should be noted that, in a variation of the present embodiment, the number of the guiding block 323b on each of the opposite ends of the synchronizer 33 may be one, and the number of the guiding groove 322a of each of the drive shafts 32 may be one as well.

The torsion plates 34 are arranged along the width direction (D2) and tightly abut against each other, and each of the torsion plates 34 is connected to the extending portions 323 of the drive shafts 32 for providing torsion to the drive shafts 32. The greater the number of the torsion plates 34, the greater the total torsion.

Referring back to FIGS. 10 and 11, the connection subunit 35 is connected between the pivot block portions 313 of the shaft holder 31, and has two connecting ends 351. A length of the connection subunit 35 is maintained constant. In the present embodiment, the connection subunit 35 is a chain, and includes a plurality of connecting pins 353 and a plurality of links 352 serially interconnected by the connecting pins 353. Specifically, the links 352 are arranged in two rows, and each of the links 352 includes a plurality of link plates 352a arranged in the width direction (D2) and abutting against each other. The opposite outermost ones of the connecting pins 353 are respectively located at the two connecting ends 351 of the connection subunit 35 and are connected respectively to the two compensation subunits 36. Another one of the connecting pins 353 located in the middle of the connection subunit 35 is connected between the pivot block portions 313 of the shaft holder 31.

However, the connection subunit 35 is not limited to the chain. In variations of the embodiment, the connection subunit 35 may include other bendable materials.

Figure 11:
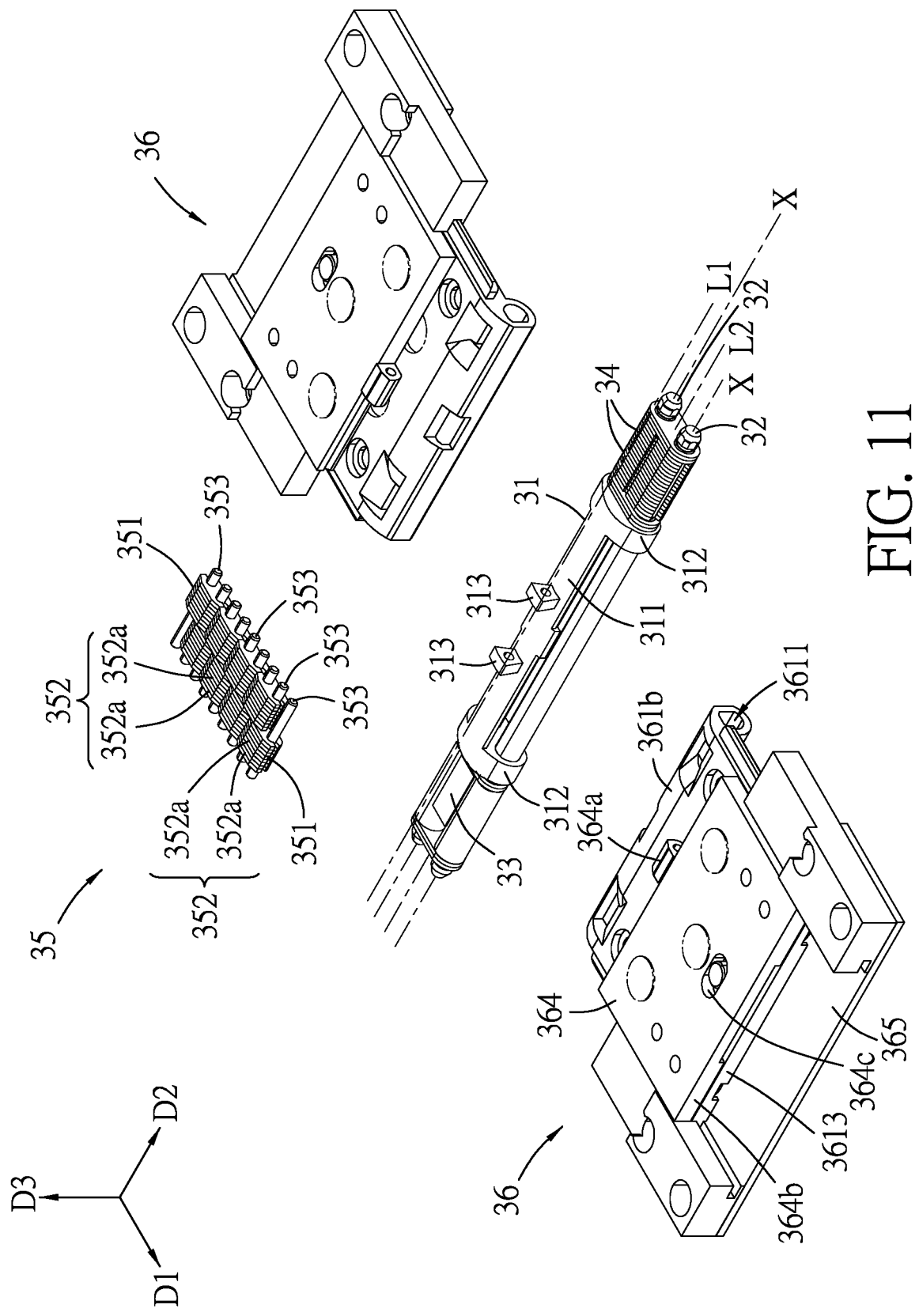
FIG. 11 is an exploded perspective view of FIG. 10.
Figure 12:
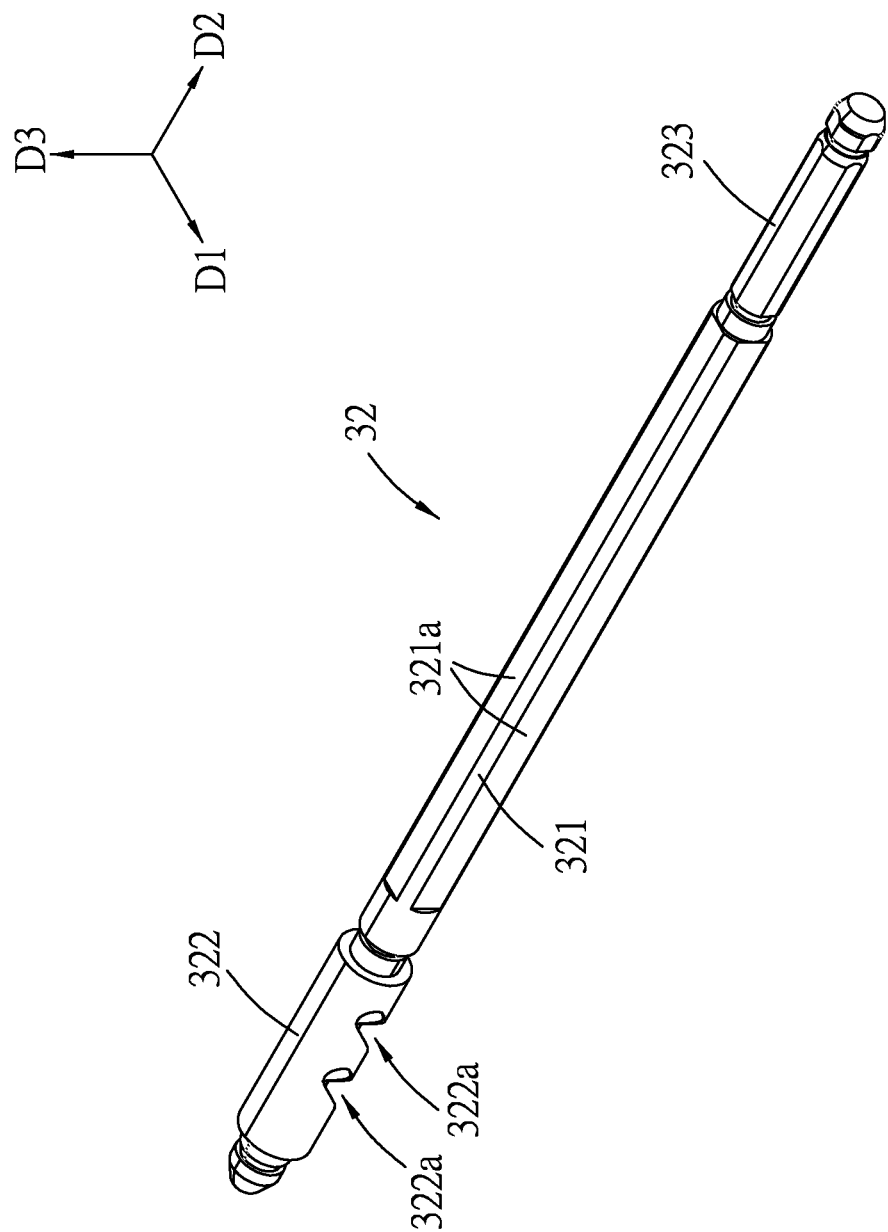
FIG. 12 is a perspective view of a drive shaft of one of the hinge units of the embodiment.
Figure 16:
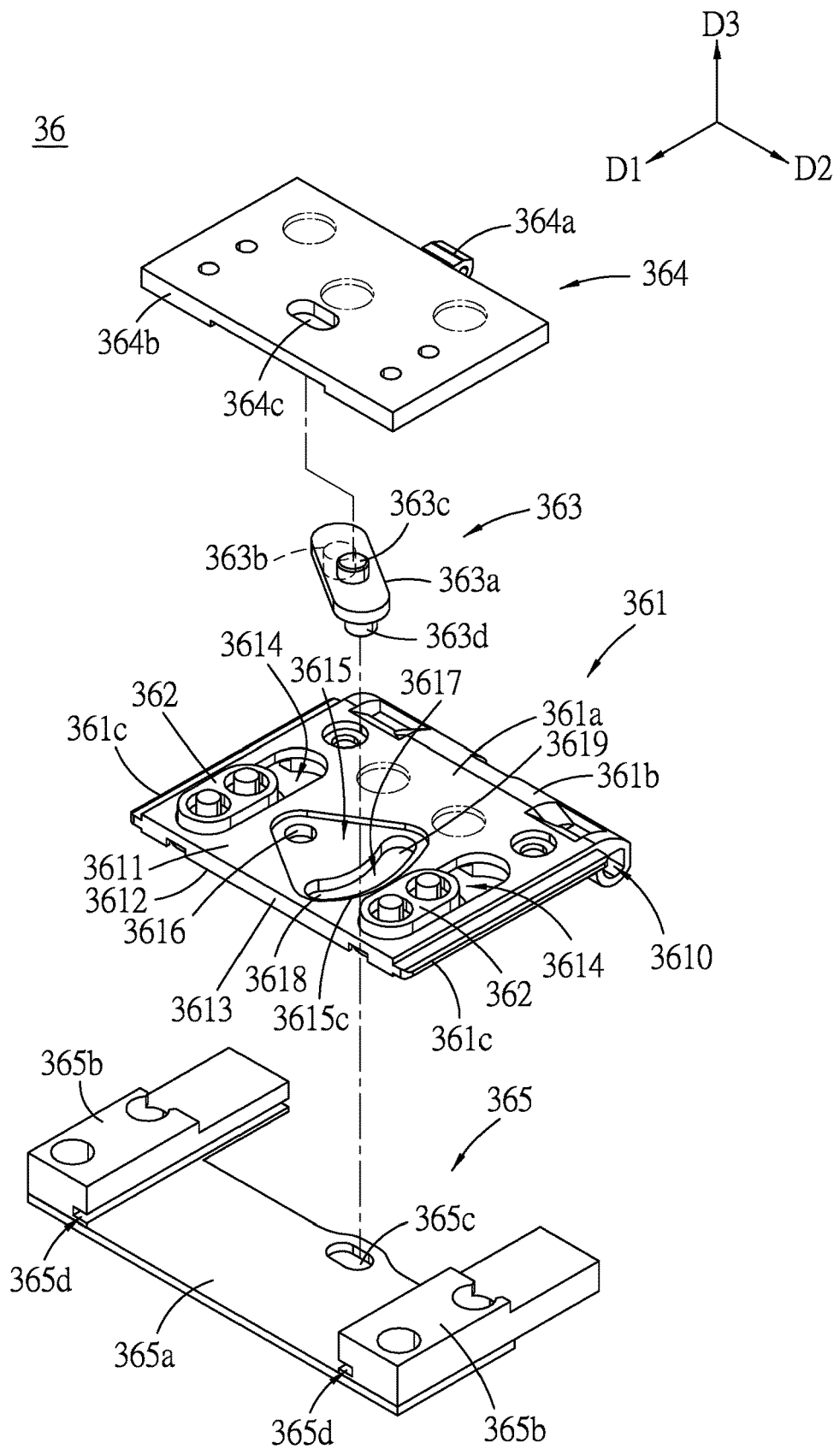
FIG. 16 is a partly exploded perspective view of a compensation subunit of the one of the hinge units.

Referring to FIGS. 11 and 16, the compensation subunits 36 are opposite to each other in the lengthwise direction (D1). Each of the compensation subunits 36 includes a rotating plate 361, two sliding blocks 362, a crank member 363, a driving plate 364 and a driven plate 365.

The rotating plates 361 of the compensation subunits 36 are respectively connected to the drive shafts 32, the driving plates 364 of the compensation subunits 36 are connected to the connection subunit 35, and the driven plates 365 of the compensation subunits 36 are respectively connected to the first and second casings 11a, 11b.

The rotating plate 361 of each of the compensation subunits 36 has a rotating plate portion 361a, a sleeve portion 361b and two guiding protrusions 361c.

The rotating plate portion 361a is connected co-rotatably to the driving portion 321 of a respective one of the drive shafts 32 via the sleeve portion 361b. Specifically, the sleeve portion 361b is fixedly connected to the rotating plate portion 361a, and is formed with a shaft hole 3610 that is fittingly engaged with the driving portion 321 of the respective one of the drive shafts 32. The guiding protrusions 361c are connected to opposite ends of the plate portion 361a in the width direction (D2).

Referring to FIG. 16, the rotating plate portion 361a of the rotating plate 361 has opposite first and second surfaces 3611, 3612, a first outer edge 3613, two elongated track slots 3614, a circular-sector-shaped crank recess 3615, a pin hole 3616 and an arc-shaped slot 3617.

The first and second surfaces 3611, 3612 of the rotating plate portion 361a are respectively distal from and proximate to the folding surface 15 of a respective one of the first and second casings 11a, 11b. The first outer edge 3613 is distal from the driving portion 321 of the respective one of the drive shafts 32 (i.e., the first outer edge 3613 is distal from the sleeve portion 361b of the rotating plate 361), and extends in the width direction (D2). The track slots 3614 extend through the first and second surfaces 3611, 3612, and are parallel to the guiding protrusions 361c of the rotating plate 361. The crank recess 3615 is formed in the first surface 3611 and has an arc end 3615c. The pin hole 3616 and the arc-shaped slot 3617 are respectively distal from and proximate to the arc end 3615c of the crank recess 3615, and extend from the crank recess 3615 through the second surface 3612. The arc-shaped slot 3617 has an unfolded end section 3618 and a folded end section 3619.

The driving plate 364 of each of the compensation subunits 36 has a side protruding portion 364a, a second outer edge 364b and an elongated driving slot 364c, is slidably connected to the first surface 3611 of the rotating plate 361 of the compensation subunit 36, and is connected to a respective one of the connecting ends 351 of the connecting subunit 35.

Specifically, the sliding blocks 362 slidably and respectively engage the track slots 3614, and are connected to the driving plate 364. The side protruding portion 364a of the driving plate 364 is connected to a respective one of the opposite outermost ones of the connecting pins 353 of the connecting subunit 35. The second outer edge 364b is distal from the respective one of the connecting ends 351 of the connecting subunit 35 (i.e., the second outer edge 364b is distal from the side protruding portion 364a), and is parallel to the first outer edge 3613 of the rotating plate 361. The driving slot 364c is in spatial communication with the crank recess 3615 of the rotating plate 361.

The driven plate 365 of each of the compensation subunits 36 is received in a respective one of the connecting indentations 114c of the respective one of the first and second casings 11a, 11b (see FIG. 6), and has a driven plate portion 365a and two spaced-apart track block portions 365b.

Figure 17:
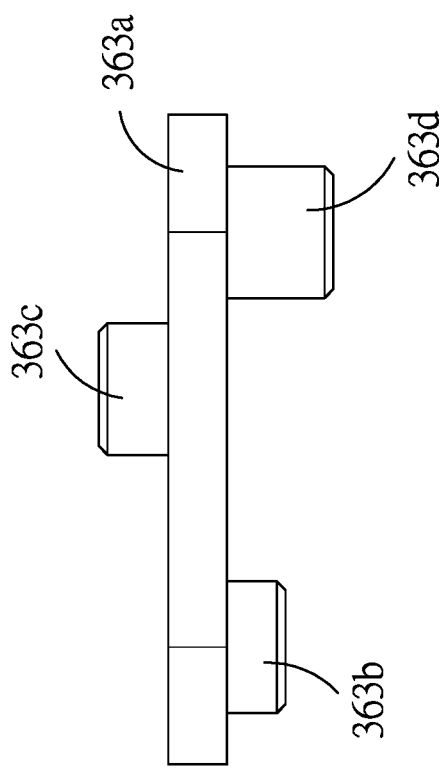
FIG. 17 is a side view of a crank member of the compensation subunit.

The driven plate portion 365a is slidably connected to the second surface 3612 of the rotating plate 361, is co-movably connected to the respective one of the first and second casings 11a, 11b, and has an elongated driven slot 365c that is in spatial communication with the arc-shaped slot 3617 of the rotating plate 361. The track block portions 365b are connected to the driven plate portion 365a, are spaced apart from each other in the width direction (D2), and are respectively formed with two track grooves 365d. The guiding protrusions 361c of the rotating plate 361 engage slidably and respectively the track grooves 365d of track block portions 365b of the driven plate 365. Referring further to FIG. 17, the crank member 363 of each of the compensation subunits 36 is received in the crank recess 3615 of the rotating plate 361, and has an arm portion 363a, a rotating pin 363b, a driving pin 363c and a driven pin 363d.

The rotating, driving and driven pins 363b, 363c, 363d are spaced apart and are connected to the arm portion 363a.

The rotating pin 363b rotatably engages the pin hole 3616 of the rotating plate 361. The driving pin 363c slidably engages the driving slot 364c of the driving plate 364. The driven pin 363d slidably extends through the arc-shaped slot 3617 of the rotating plate 361 and slidably engages the driven slot 365c of the driven plate 365. The driving pin 363c and the driven pin 363d are respectively proximate to and distal from the rotating pin 363b.

Figure 29:
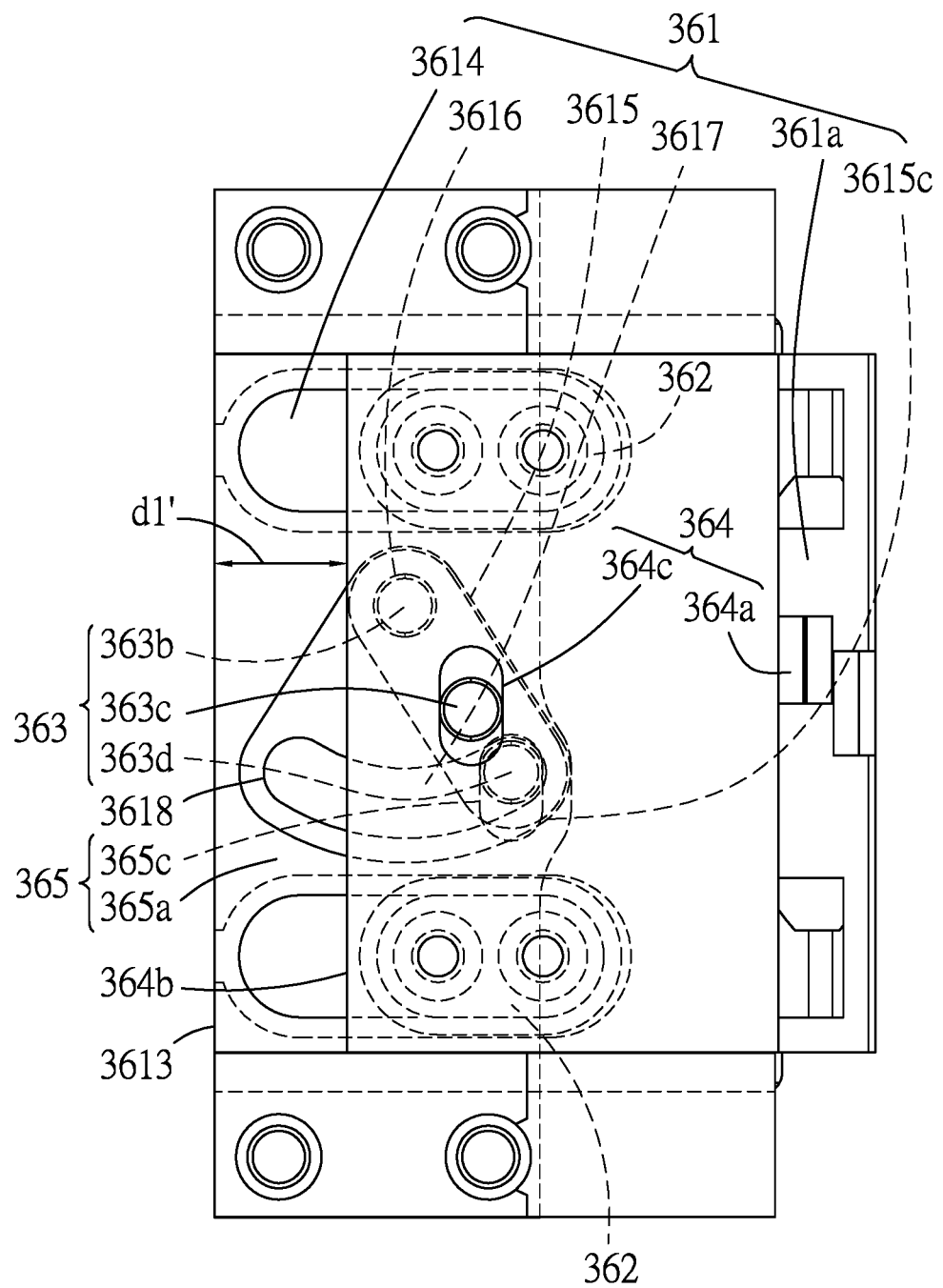
FIG. 29 is a top view of the compensation subunit, illustrating the driving pin of the crank member being moved relative to the rotating plate by a first predetermined final distance when the casings are in the folded position.
Figure 30:
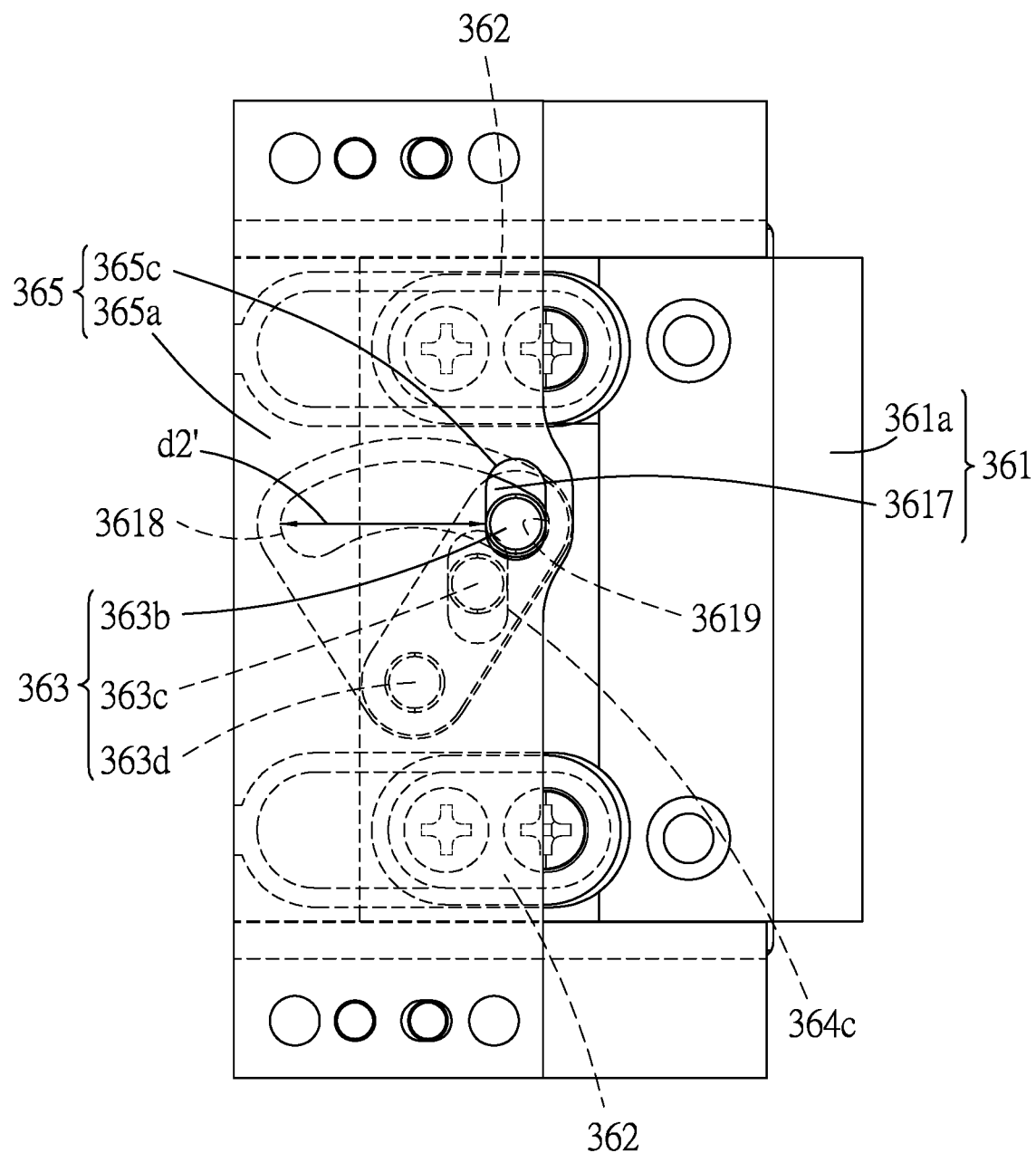
FIG. 30 is a bottom view of the compensation subunit, illustrating the driven pin of the crank member being moved relative to the rotating plate by a second predetermined final distance when the casings are in the folded position.

When the casings 11 are converted from the unfolded position to the folded position, the driving plate 364 slides relative to the rotating plate 361 by a first predetermined final distance (d1') (see FIG. 29) and cooperates with the rotating plate 361 to drive the crank member 363 to rotate in the rank recess 3615 about the rotating pin 363b relative to the rotating plate 361, thereby causing the driven pin 363d to slide from the unfolded end section 3618 to the folded end section 3619 of the arc-shaped slot 3617, and driving the driven plate 365 and the respective one of the casings 11 to cooperatively move by a second predetermined final distance (d2') (see FIG. 30) relative to the rotating plate 361 which is larger than the first predetermined final distance (d1').

It should be noted that the above-mentioned configuration and operation of the compensation subunits 36 play an important role in protecting the flexible display from being damaged. Further details regarding this feature will be described later.

Figure 9:
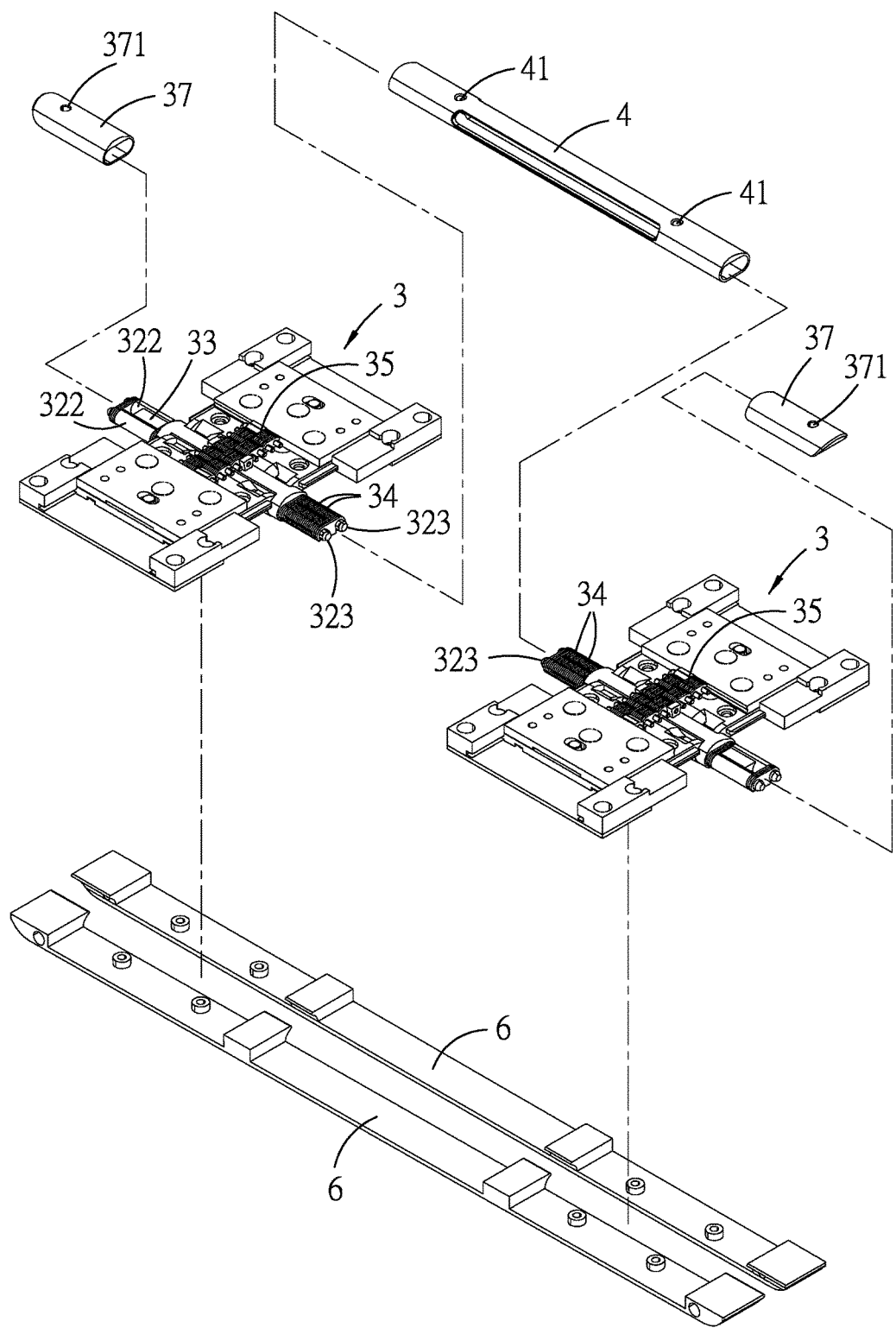
FIG. 9 is a partly exploded perspective view of FIG. 8.
Figure 10:
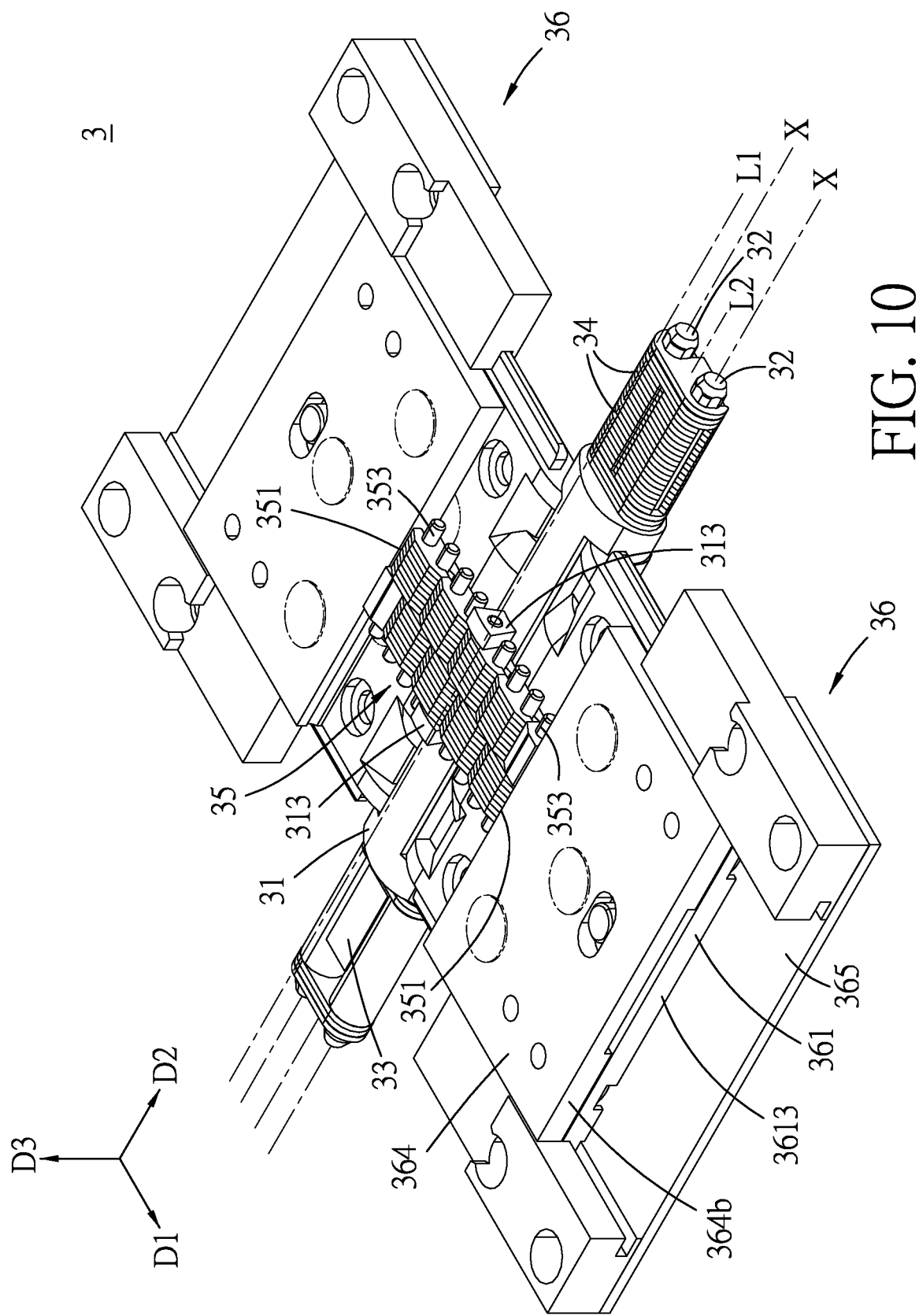
FIG. 10 is a perspective view of one of the hinge units of the embodiment.

Referring to FIG. 9, the shaft caps 37 of the hinge units 3 are spaced apart in the width direction (D2). For each of the hinge units 3, the shaft cap 37 has a first fixing hole 371 facing the casing board 12, is sleeved on the syncing portions 322 of the drive shafts 32, and covers the synchronizer 33.

The connecting tube 4 extends in the width direction (D2), and has two second fixing holes 41 spaced apart in the width direction (D2) and facing the casing board 12. One end of the connecting tube 4 is sleeved on the extending portions 323 of the drive shafts 32 of one of the hinge units 3, and the other end thereof is sleeved on the extending portions 323 of the drive shafts 32 of the other one of the hinge units 3.

Referring to FIG. 6, the support unit 5 covers the hinge units 3 and the connecting tube 4, and is mounted beneath the casing board 12 for providing consistent support to the casing board 12 during the conversion of the first and second casings 11a, 11b.

Figure 18:
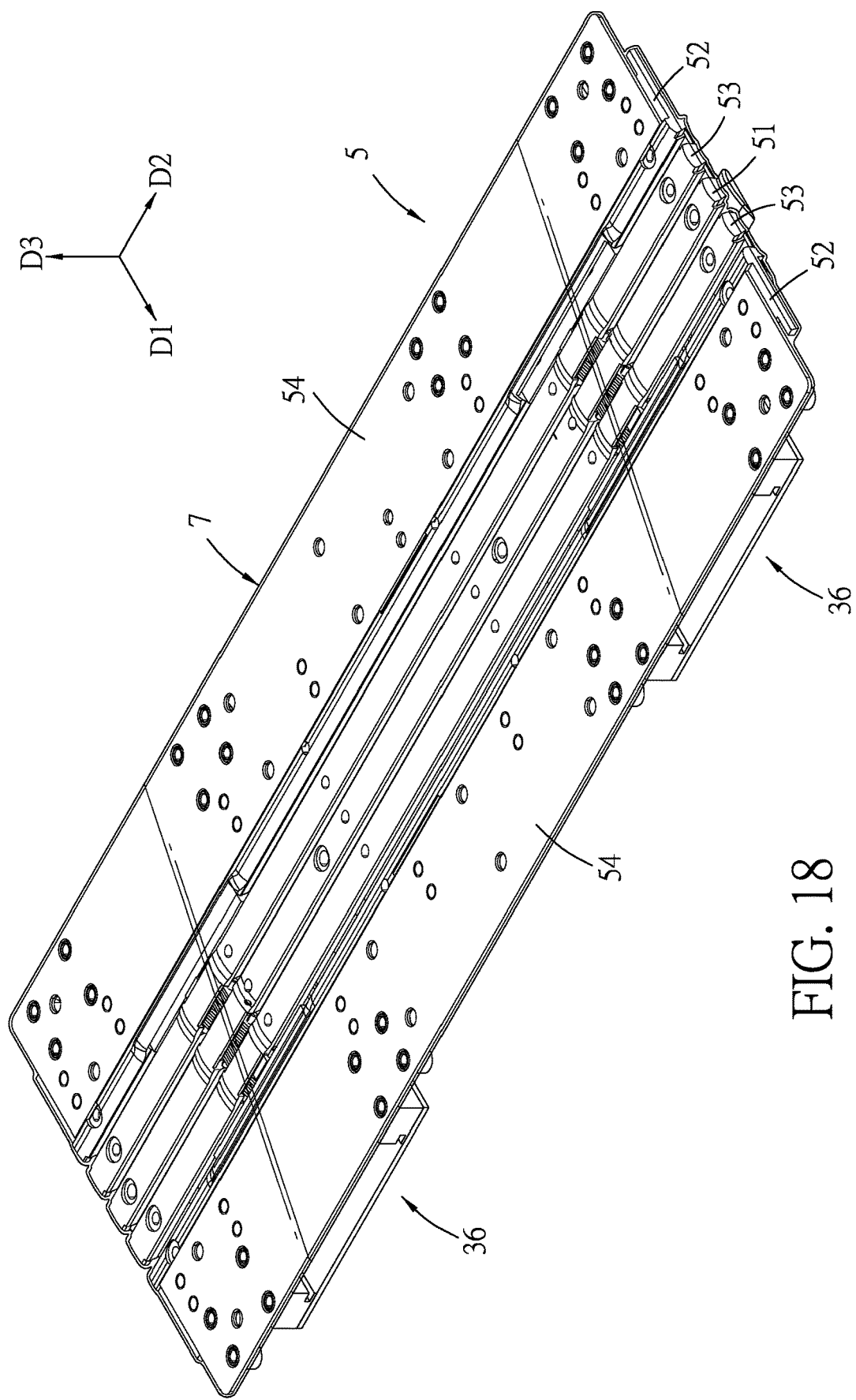
FIG. 18 is a perspective view illustrating a support unit of the embodiment covering the hinge units and the connecting tube.
Figure 19:
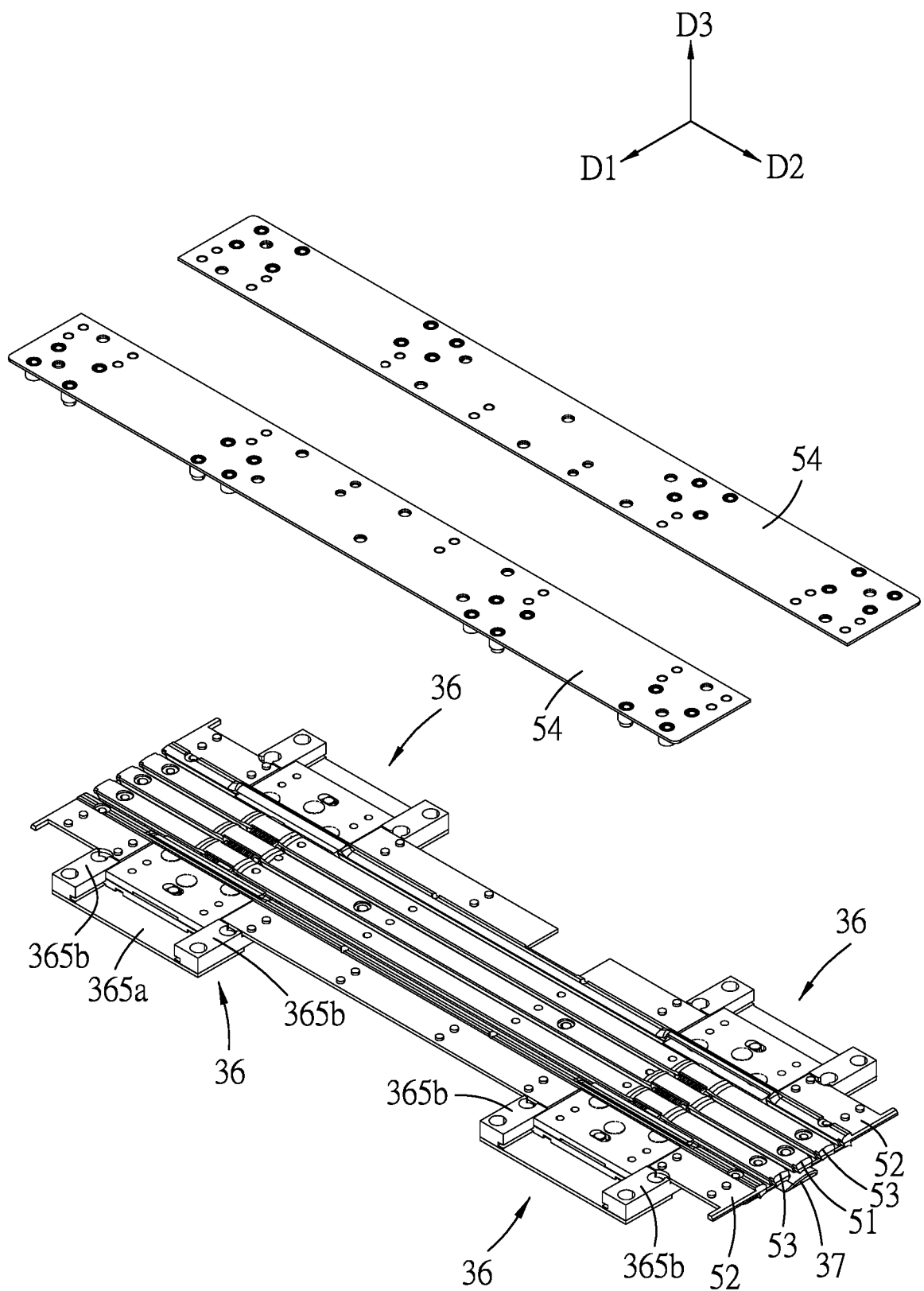
FIG. 19 is a partly exploded perspective view of FIG. 18.
Figure 20:
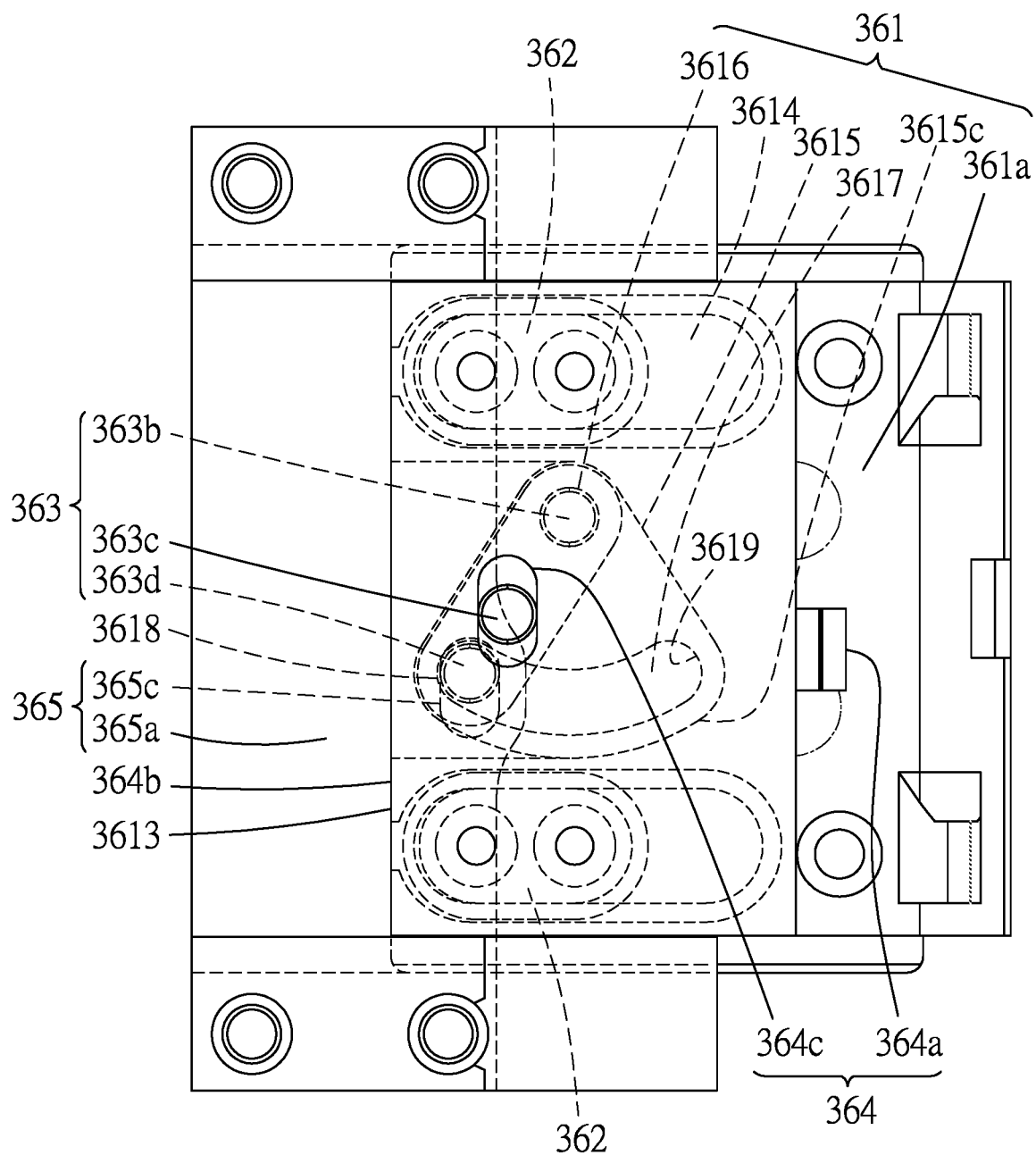
FIG. 20 is a top view of the compensation subunit, illustrating a first outer edge of a rotating plate being flushed with a second outer edge of a driving plate when the casings are in the unfolded position.
Figure 21:
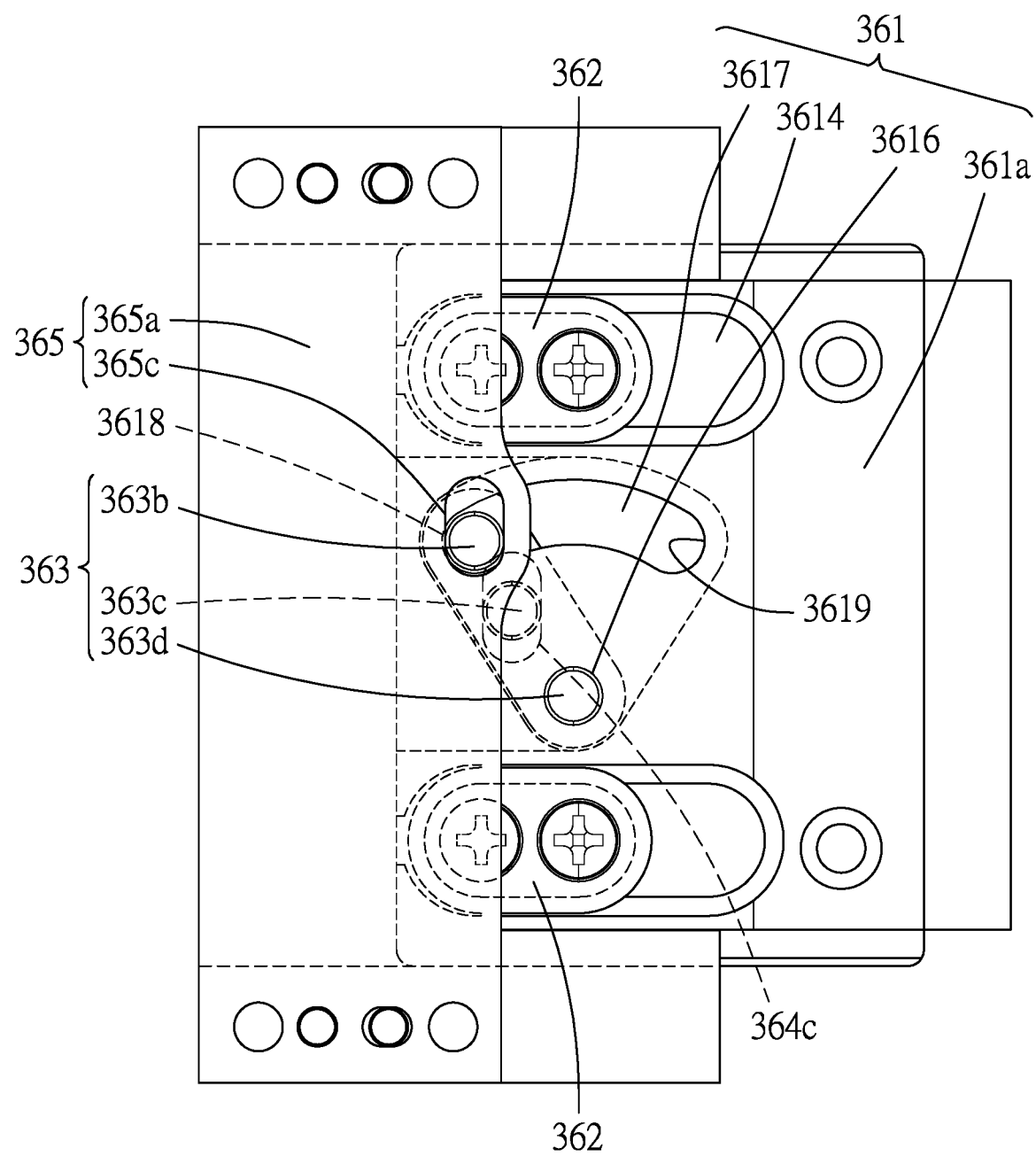
FIG. 21 is a bottom view of the compensation unit, illustrating a driven pin of the crank member at an unfolded end section of an arc slot of the rotating plate when the casings are in the unfolded position.

Specifically, referring to FIGS. 18 and 19, the support unit 5 includes a first steel strip 51, two steel plates 52, two second steel strips 53 and two connecting boards 54.

The first steel strip 51 extends in the width direction (D2), covers the shaft caps 37 of the hinge units 3 and the connecting tube 4, and is secured to the shaft caps 37 and the connecting tube 4 by four fastening members (not shown) that fixedly and respectively engage the first fixing holes 371 of the shaft caps 37 and the second fixing holes 41 of the connecting tube 4.

The steel plates 52 extend in the width direction (D2), and one of the steel plates 52 covers one of the compensation subunits 36 of one of the hinge units 3 and a respective one of the compensation subunits 36 of the other one of the hinge units 3 which is aligned with the one of the compensation subunits 36 of the one of the hinge units 3. The other one of the steel plates 52 covers the other one of the compensation subunits 36 of the one of the hinge units 3 and the other one of the compensation subunits 36 of the other one of the hinge units 3 which is aligned with the other one of the compensation subunits 36 of the one of the hinge units 3.

The second steel strips 53 extend in the width direction (D2), are disposed between the steel plates 52 and flank the first steel strip 51. The connecting boards 54 extend in the width direction (D2). Each of the connecting boards 54 covers a respective one of the steel plates 52 and a respective one of the first and second casings 11a, 11b, and is fixedly connected the respective one of the first and second casings 11a, 11b.

In the present embodiment, the outward-folding display device 100 further includes a soft layer 7 which is shown in FIGS. 6 and 18. The second steel strips 53 are not directly connected to the first steel strip 51 and the steel plates 52. Instead, the first and second steel strips 51, 53, the steel plates 52 and the connecting boards 54 are all embedded in the soft layer 7 which is formed by injection molding technique. In such a manner, the soft layer 7 is disposed beneath the casing board 12, covers the support unit 5, and connects the first and second steel strips 51, 53, the steel plates 52 and the connecting boards 54 all together. In the present embodiment, the soft layer 7 is made of silicone rubber.

Figure 8:
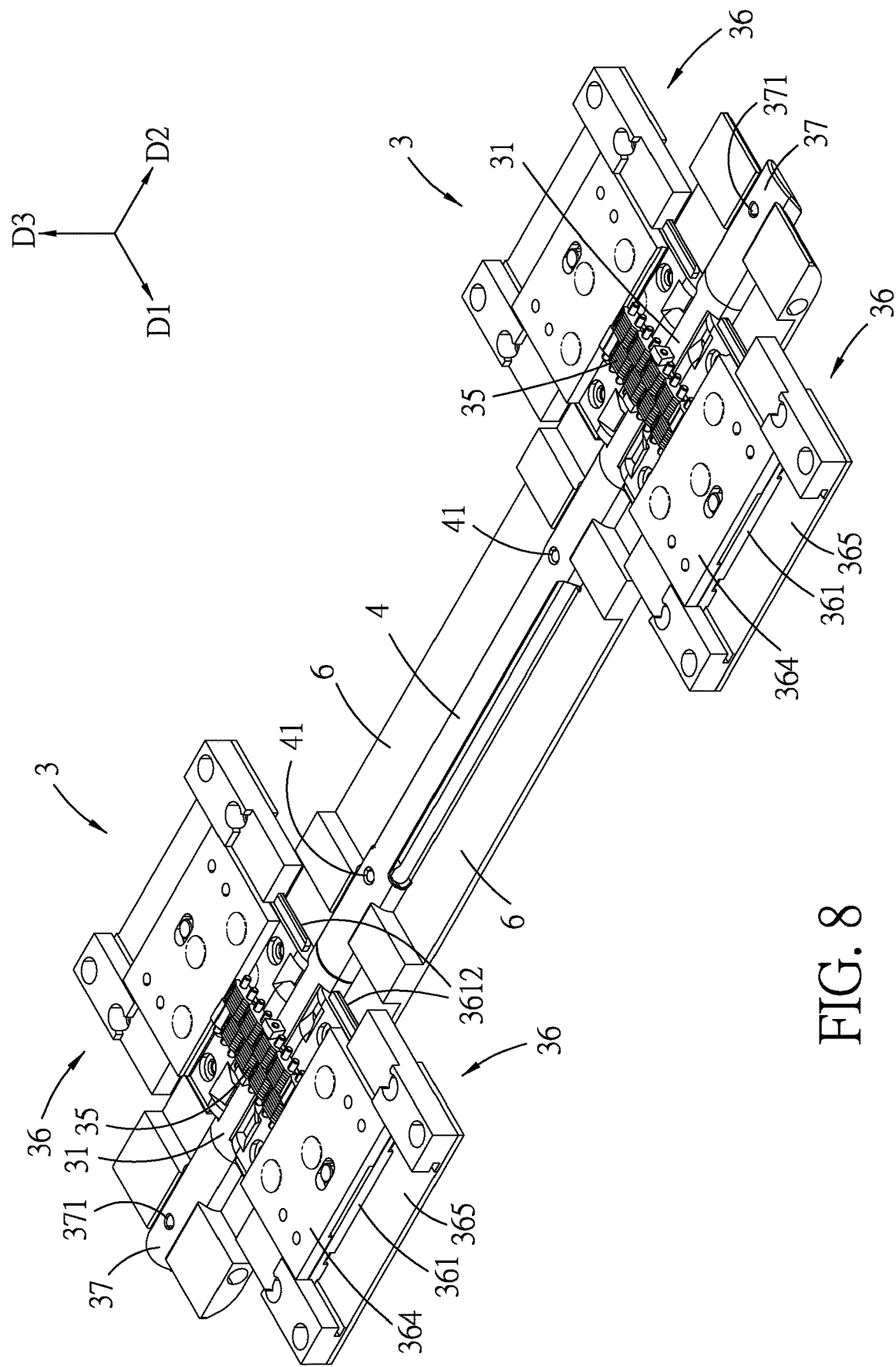
FIG. 8 is a perspective view illustrating two hinge units, a connecting tube and the block boards of the embodiment.

Referring to FIGS. 8 and 9, the block boards 6 extend in the width direction (D2) and flank the connecting tube 4.

Specifically, one of the block boards 6 is connected to the rotating plate 361 of one of the compensation subunits 36 of one of the hinge units 3 and the rotating plate 361 of a respective one of the compensation subunits 36 of the other one of the hinge units 3 which is aligned with the one of the compensation subunits 36 of the one of the hinge units 3. The other one of the block boards 6 is connected to the rotating plate 361 of the other one of the compensation subunits 36 of the one of the hinge units 3 and the other one of the compensation subunits 36 of the other one of the hinge units 3 which is aligned with the other one of the compensation subunits 36 of the one of the hinge units 3.

Referring again to FIG. 2, when the first and second casings 11a, 11b are in the unfolded position, the block boards 6 are exposed from a gap between the folding surfaces 15 of the first and second casings 11a, 11b.

Referring to FIGS. 1, 6, 10 and 17, when the first and second casings 11a, 11b are in the unfolded position, the display surface 14, the casing board 12 and the support unit 5 are all flat. The connection subunit 35 of each of the hinge units 3 extends in the lengthwise direction (D1), and the synchronizers 33 of the hinge units 3 are proximate to the shaft holders 31 of the hinge units 3. For each of the compensation subunits 36 of each of the hinge units 3, the second outer edge 364b of the driving plate 364 and the first outer edge 3613 of the rotating plate 361 are flushed. The driven pin 363d of the crank member 363 is at the unfolded end section 3618 of the arc-shaped slot 3617 of the rotating plate 361. The sliding blocks 362 are distal from the corresponding drive shaft 32.

Figure 22:
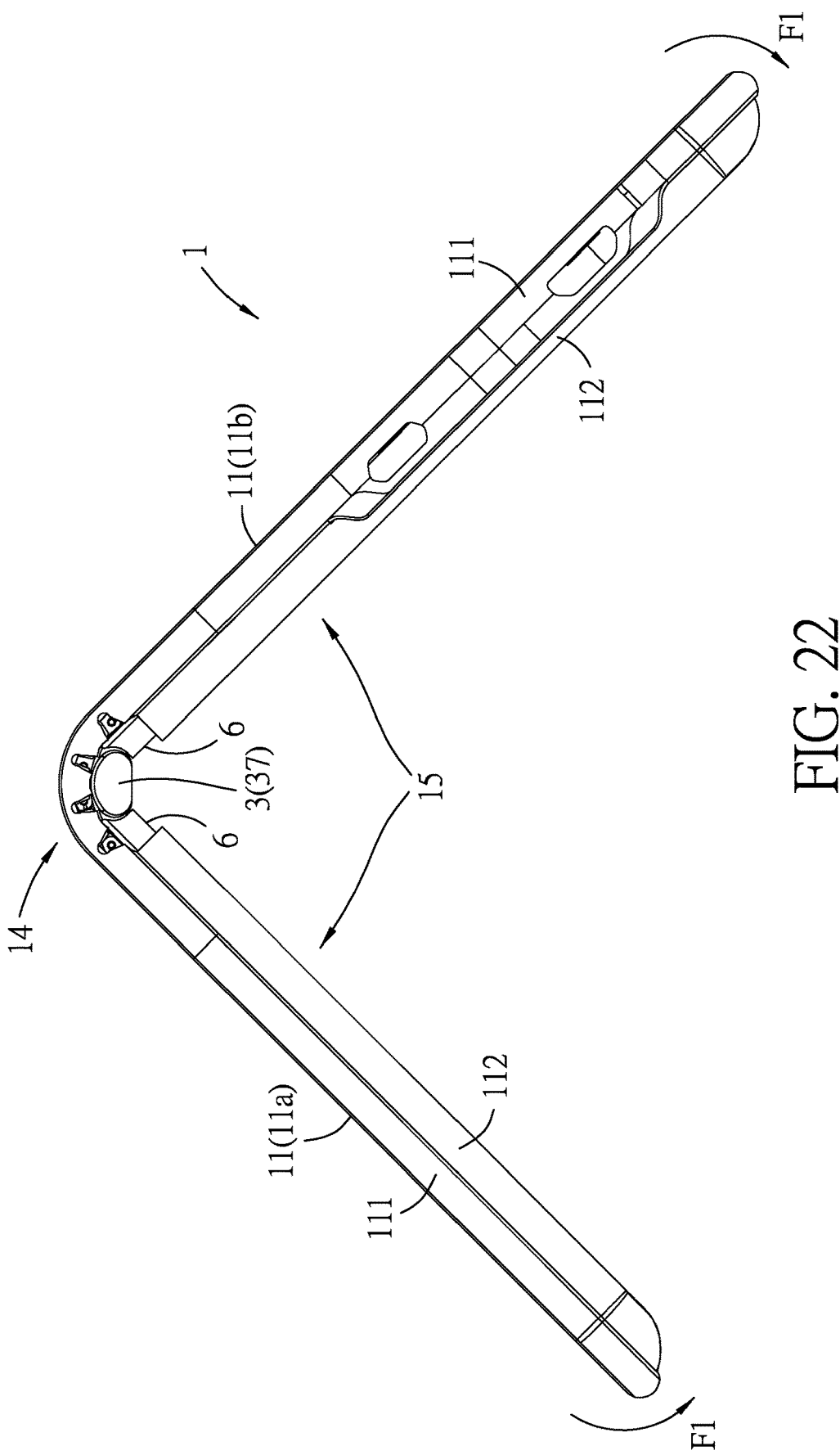
FIG. 22 is a side view of the embodiment, illustrating the casings in a position between the folded and unfolded positions.
Figure 23:
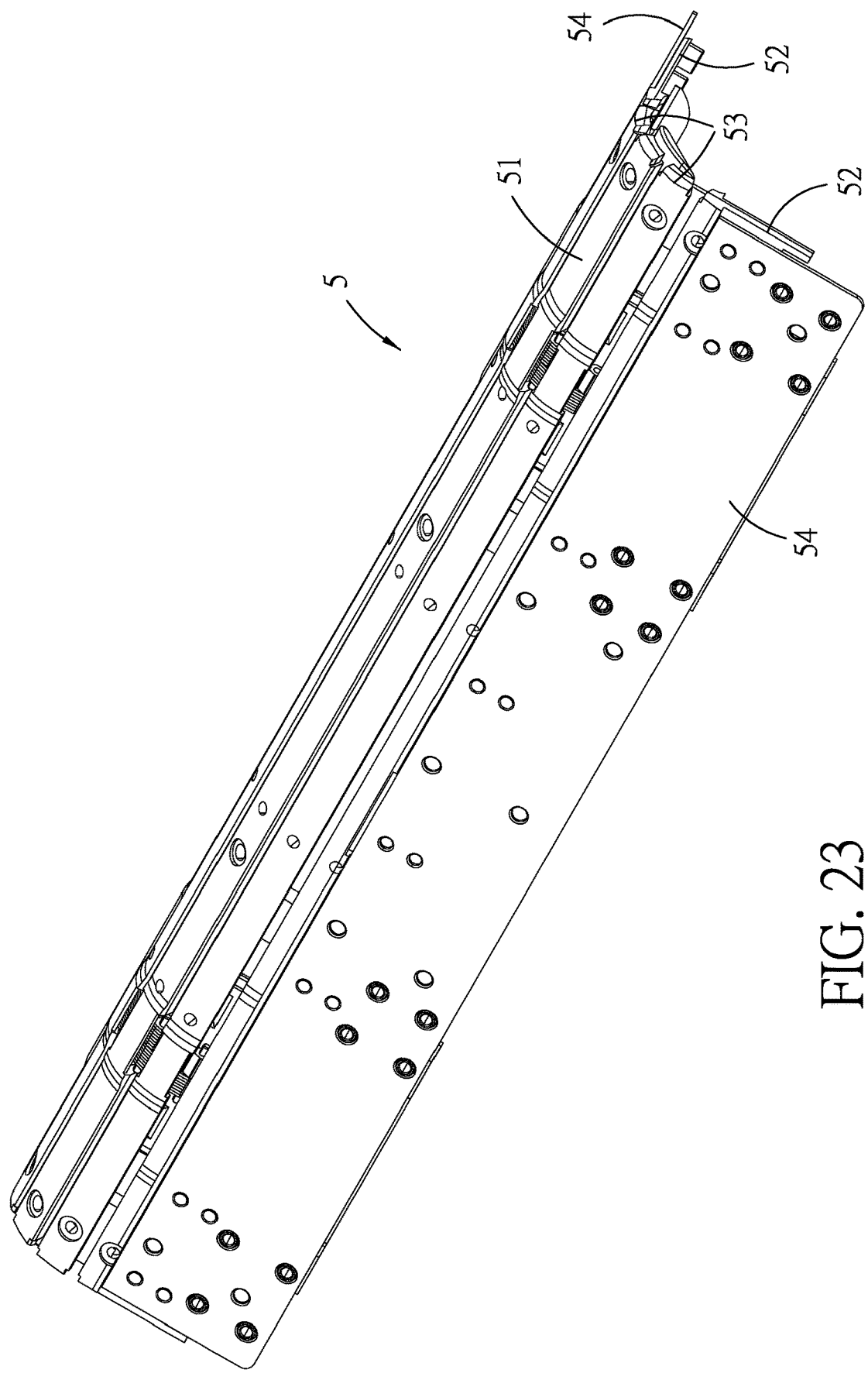
FIG. 23 is a perspective view illustrating the support unit when the casings are in the position between the folded and unfolded positions.
Figure 24:
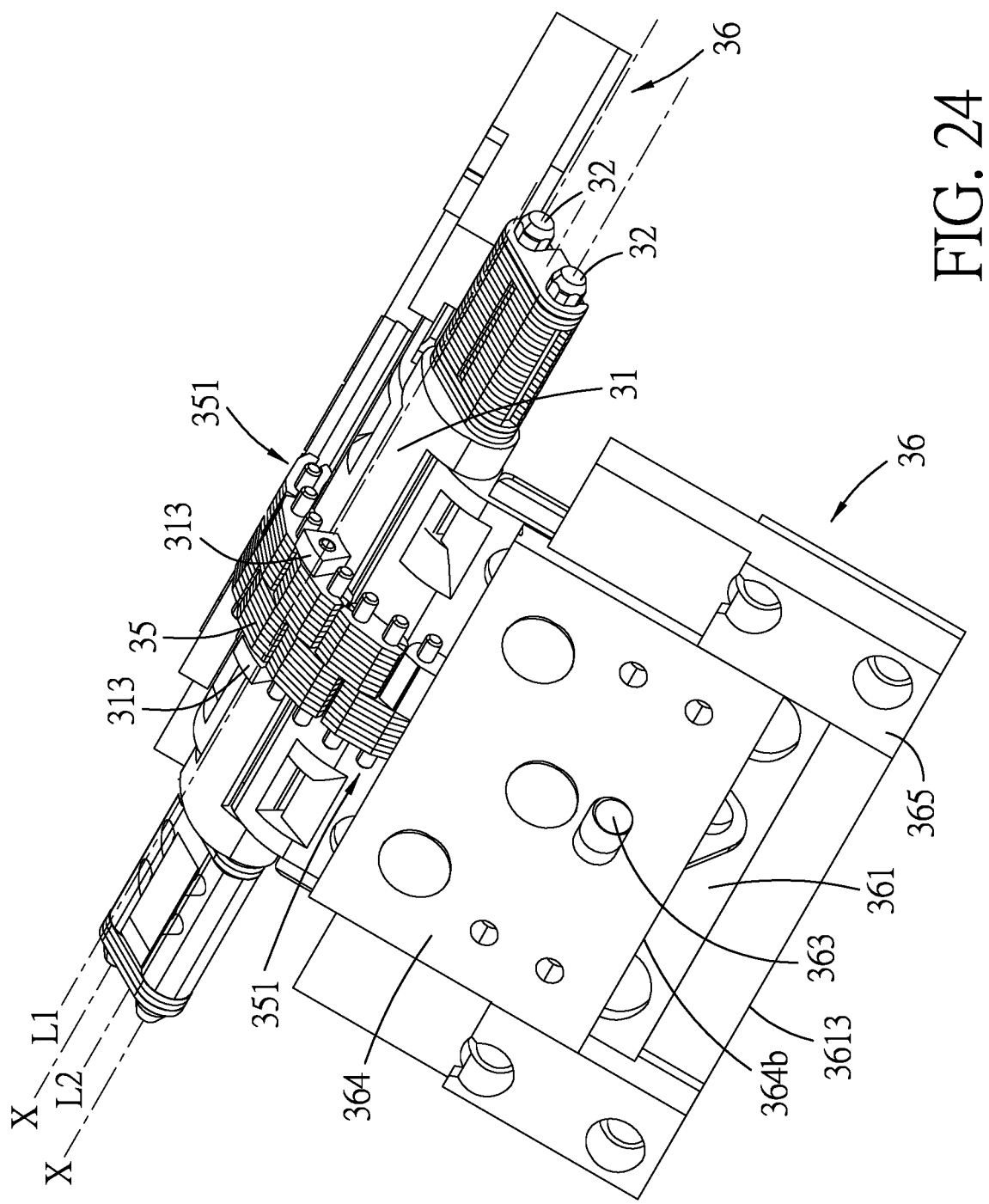
FIG. 24 is a perspective view illustrating the one of the hinge units when the casings are in the position between the folded and unfolded positions.
Figure 25:
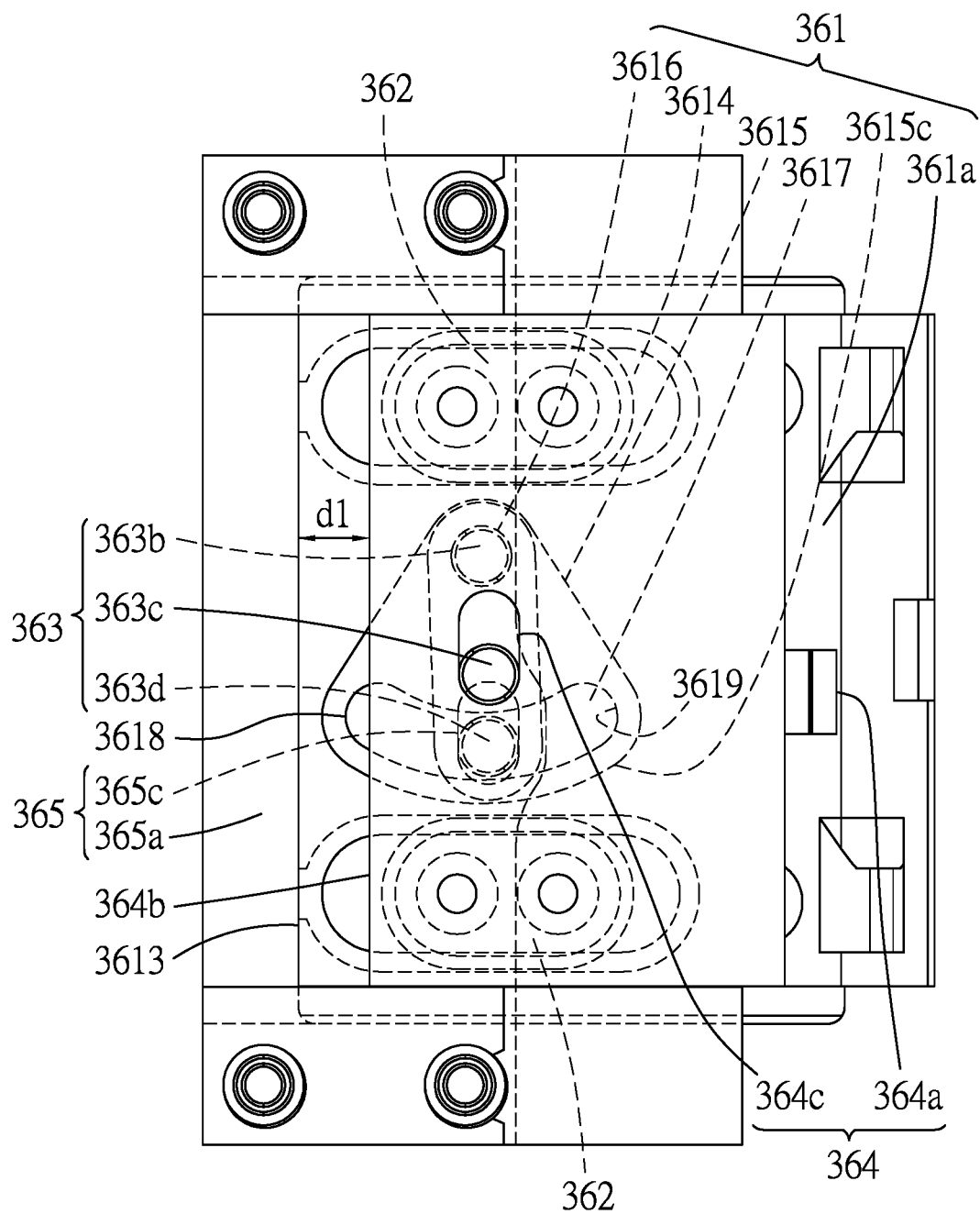
FIG. 25 is a top view of the compensation subunit, illustrating the second outer edge of the driving plate being moved relative to the first outer edge of the rotating plate by a first predetermined distance, and a driving pin of the crank member being moved relative to the rotating plate by the first predetermined distance when the casings are in the position between the folded and unfolded positions.

Referring to FIGS. 22 to 26, when the first and second casings 11a, 11b are converted from the unfolded position toward the folded position, for each of the compensation subunits 36 of each of the hinge units 3, the rotating plate 361 rotates about the shaft axis (X) of the corresponding drive shaft 32 in a folding direction (F1) (see FIGS. 2 and 22). Since the first axis (L1) is above the shaft axes (X), and since the length of the connection subunit 35 is maintained constant, the driving plate 364 is pulled by the connection subunit 35 to slide relative to the rotating plate 361 while rotating with the rotating plate 361 in the folding direction (F1) at the same time. The sliding blocks 362, which are connected to the driving plate 364, slide with the driving plate 364 in the respective track slots 3614 of the rotating plate 361 for guiding and stabilizing the slide movement of the driving plate 364.

Meanwhile, driven by the slide movement of the driving plate 364 relative to the rotating plate 361, the crank member 363 begins to rotate relative to the rotating plate 361.

Specifically, the driving pin 363c of the crank member 363 is driven by the driving plate 364 such that crank member 363 rotates about the rotating pin 363b thereof in the crank recess 3615 of the rotating plate 361, thereby causing the driven pin 363d of the crank member 363 to slide in the arc-shaped slot 3617 from the unfolded end section 3618 toward the folded end section 3619 while remaining engaged with the driven slot 365c of the driven plate 354.

As a result, the rotating and driving plates 361, 364 cooperatively drive the driven plate 365 and the respective one of the first and second casings 11a, 11b to slide relative to the rotating plate 361 via the slidable engagement between the guiding protrusions 361c of the rotating plate 361 and the track grooves 365d of the driven plate 365.

Figure 26:
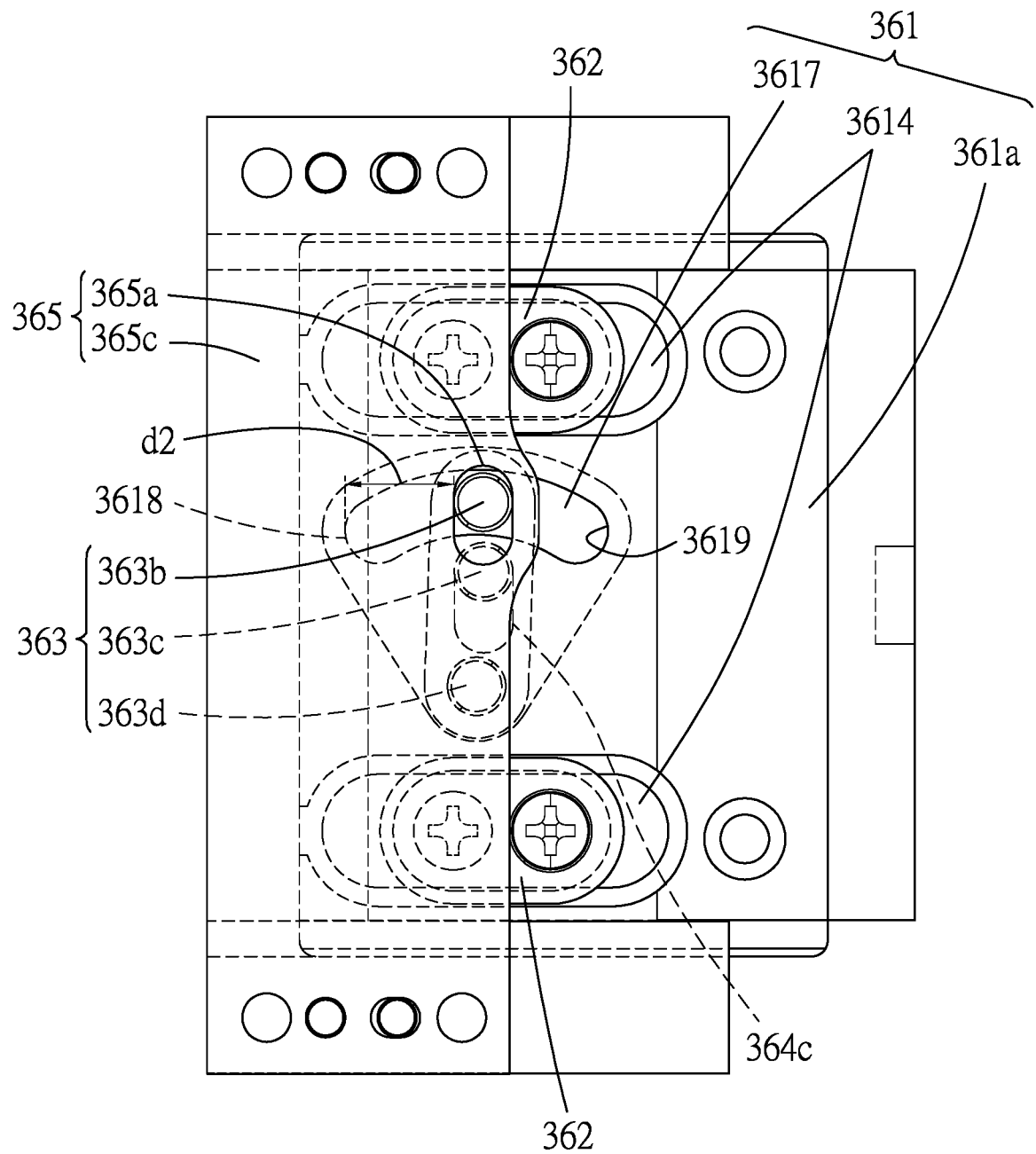
FIG. 26 is a bottom view of the compensation unit, illustrating the driven pin of the crank member being moved relative to the rotating plate by a second predetermined distance when the casings are in the position between the folded and unfolded positions.
Figure 27:
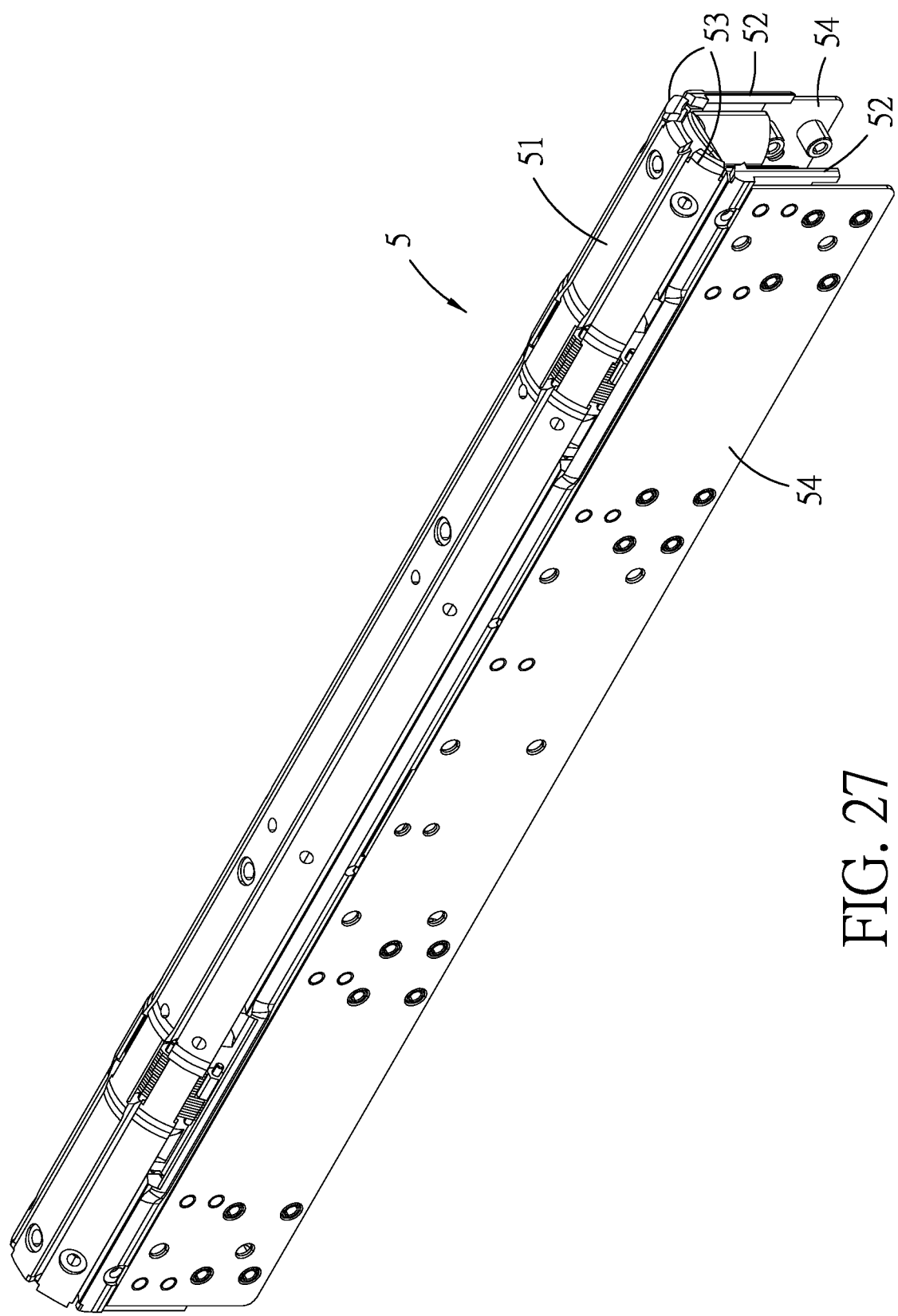
FIG. 27 is a perspective view illustrating the support unit when the casings are in the folded position.
Figure 28:
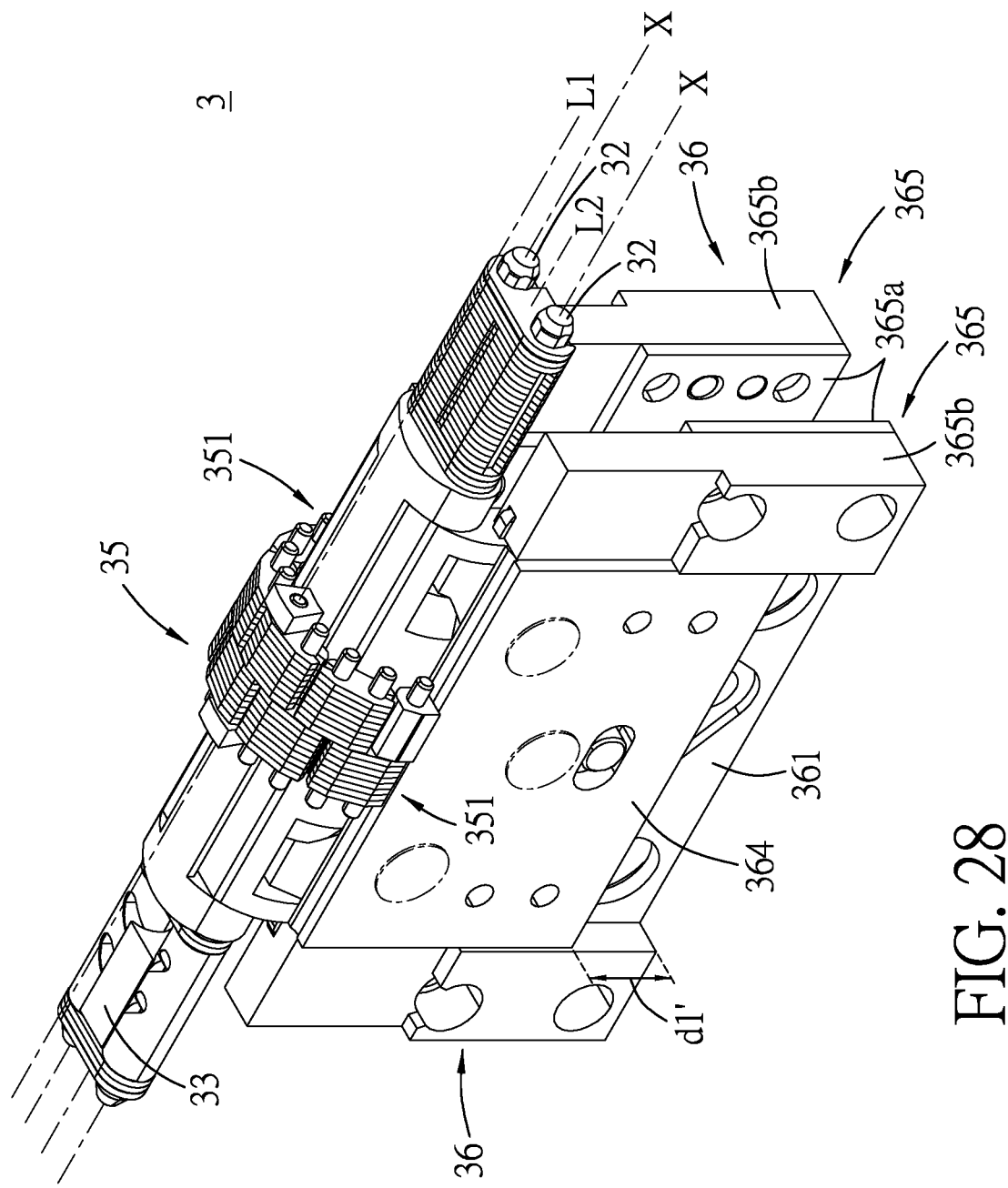
FIG. 28 is a perspective view illustrating the one of the hinge units when the casings are in the folded position.

It should be noted that, as the driving plate 364 slides relative to the rotating plate 361 by a first predetermined distance (d1) (see FIG. 25), the driven plate 365 slides relative to the rotating plate 361 by a second predetermined distance (d2) (see FIG. 26). The first and second predetermined distances (d1, d2) are in proportion with each other, and the second predetermined distance (d2) is larger than the first predetermined distance (d1).

In virtue of this feature, the flexible display, being connected to the driven plates 365 of the hinge units 3 via the first and second casings 11a, 11b, follows the above-mentioned movement of the driven plates 365 and is protected from being pulled and damaged. At the same time, the casing board 12 and support unit 5 are bent to conform to the movement of the hinge units 3 and consistently provide support to the flexible display.

Referring to FIGS. 3 to 5 and FIGS. 27 to 30, when the first and second casings 11a, 11b are in the folded position, the folding surfaces 15 are facing toward each other and are perpendicular to the lengthwise direction (D1). The display surface 14, the casing board 12 and the support unit 5 are bent to conform to the conversion of the hinge units 3. The synchronizers 33 of the hinge units 3 are distal from the shaft holders 31 of the hinge units 3. For each of the compensation subunits 36 of each of the hinge units 3, the second outer edge 364b of the driving plate 364 is spaced apart from the first outer edge 3613 of the rotating plate 361 by the first predetermined final distance (d1'), that is, the driving plate 364 has slid relative to the rotating plate 361 by the first predetermined final distance (d1'). The driven pin 363d of the crank member 363 is at the folded end section 3619 of the arc-shaped slot 3617 of the rotating plate 361, that is, the driven plate 365 has slid relative to the rotating plate 361 by the second predetermined final distance (d2'). The sliding blocks 362 are proximate to the corresponding drive shafts 32.

Referring again to FIGS. 6 and 7, under normal circumstances, that is, the hinge units 3 of the outward-folding display device 100 are functioning properly, the flexible display and the sliding board 13 do not slide relative to the second casing 11b during the above-mentioned conversion process. However, if the hinge units 3 malfunction or cannot function as expected due to reasons such as manufacturing errors or human factors, the flexible display, the sliding board 13, the buffer and linking blocks 21, 22 of the display protection module 2 will slide together relative to the second casing 11b. Thus, the flexible display is protected from being damaged.

Specifically, during operation of the display protection module 2 when the first and second casings 11a, 11b are converted from the unfolded position to the folded position, each of the buffer blocks 21 will move from the default end 1141 to the buffer end 1142 of a respective one of the buffer slots 114d. Each of the linking blocks 22 will move from a respective one of the limiting hole 114f into a corresponding one of the cut-out sections 114e against a resilient force of a respective one of the resilient members 23.

Moreover, by virtue of the resilient force of the resilient members 23, when the first and second casings 11a, 11b are converted from the folded position back to the unfolded position, the linking blocks 22 will be biased back to the limiting holes 114f, and the buffer blocks 21 will move from the buffer ends 1142 to the default ends 1141 of the buffer slots 114d, so that the flexible display will not be creased.

It should be noted that the second casing 11b and the display protection module 2 are not limited to be in the outward-folding display device 100 of the present embodiment. In other variations of the embodiment, the second casing 11b and the display protection module 2 may be combined with other types of hinge, pivot device or casing, etc.

In summary, the outward-folding display device 100 of the present embodiment has advantages as follows.

By virtue of the synchronizers 33 of the hinge units 3, the rotations of the drive shafts 32 of the hinge units 3 are synchronized, which helps facilitate and stabilize the conversion process of the first and second casings 11a, 11b. Also, the compensation subunits 36 of the hinge units 3 compensate the displacement resulting from the conversion process, and protect the flexible display from being damaged. Finally, in cases where the hinge units 3 fail to function properly, the flexible display is still protected by the display protection module 2.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An outward-folding display device adapted to be connected to a flexible display, said outward-folding display device comprising:
    a casing unit including two flat casings that are arranged in a lengthwise direction, each of said casings having a folding surface and being adapted to be connected to the flexible display; and
    two hinge units spaced apart in a width direction that is perpendicular to the lengthwise direction, and connected between said casings such that said casings are convertible between an unfolded position, where said folding surfaces of said casings are coplanar and are perpendicular to a height direction which is perpendicular to the lengthwise and width directions, and a folded position, where said folding surfaces are facing toward each other and are perpendicular to the lengthwise direction, each of said hinge units including a shaft holder that has a connecting portion extending in the width direction, two pivot block portions connected to said connecting portion and spaced apart along a first axis in the width direction, and two bushing portions connected to said connecting portion and spaced apart in the width direction along a second axis, two drive shafts that are spaced apart in the lengthwise direction, each of said drive shafts extending through said bushing portions of said shaft holder along a shaft axis that extends in the width direction, being rotatable about the shaft axis, and having a driving portion and a syncing portion that is formed with a guiding groove extending helically about the shaft axis, said guiding grooves of said drive shafts being symmetrical with each other, a synchronizer that is clamped between said syncing portions of said drive shafts, and that has two guiding blocks engaged respectively and symmetrically with said guiding grooves of said syncing portions of said drive shafts so that the rotations of said drive shafts about the shaft axes are synchronized and are respectively in opposite directions, a flexible connection subunit that is connected between said pivot block portions of said shaft holder, and that has two connecting ends, a length of said connection subunit being maintained constant, and two compensation subunits opposite to each other in the lengthwise direction, each of said compensation subunits including a rotating plate having
a rotating plate portion that is connected co-rotatably to said driving portion of a respective one of said drive shafts, and that has opposite first and second surfaces being respectively distal from and proximate to said folding surface of a respective one of said casings, a first outer edge distal from said driving portion of said respective one of said drive shafts and extending in the width direction, a circular-sector-shaped crank recess formed in said first surface and having an arc end, and a pin hole and an arc-shaped slot being respectively distal from and proximate to said arc end of said crank recess and extending from said crank recess through said second surface, said arc-shaped slot having an unfolded end section and a folded end section, and
two guiding protrusions that are connected to opposite ends of said plate portion in the width direction, a driving plate slidably connected to said first surface of said rotating plate, connected to a respective one of said connecting ends of said connecting subunit, and having a driving slot that is in spatial communication with said crank recess of said rotating plate, and a second outer edge that is distal from said respective one of said connecting ends of said connecting subunit, and that is parallel to said first outer edge of said rotating plate, a driven plate having a driven plate portion that is slidably connected to said second surface of said rotating plate, that is co-movably connected to the respective one of said casings, and that has a driven slot in spatial communication with said arc-shaped slot, and two spaced-apart track block portions that are connected to said driven plate portion, and that are respectively formed with two track grooves, said guiding protrusions of said rotating plate engaging slidably and respectively said track grooves, and a crank member received in said crank recess, and having a driving pin that slidably engages said driving slot of said driving plate, a driven pin that slidably extends through said arc-shaped slot of said rotating plate and slidably engages said driven slot of said driven plate, and a rotating pin that rotatably engages said pin hole, said driving pin and said driven pin being respectively proximate to and distal from said rotating pin;

wherein, when said casings are converted from the unfolded position to the folded position, said driving plate slides relative to said rotating plate by a first predetermined final distance and cooperates with said rotating plate to drive said crank member to rotate in said rank recess about said rotating pin relative to said rotating plate, thereby causing said driven pin to slide from said unfolded end section to said folded end section, and driving said driven plate and the respective one of said casings to cooperatively move by a second predetermined final distance relative to said rotating plate which is larger than the first predetermined final distance.

2. The outward-folding display device as claimed in claim 1, wherein:
said rotating plate portion of said rotating plate of each of said compensation subunits further has an elongated track slot extending through said first and second surfaces, and being parallel to said guiding protrusions of said rotating plate; and
each of said compensation subunits further includes a sliding block connected to said driving plate and slidably engaging said track slot of said rotating plate portion of said rotating plate.

3. The outward-folding display device as claimed in claim 1, wherein;
said connection subunit of each of said hinge units is a chain, and includes a plurality of connecting pins, and a plurality of links serially interconnected by said connecting pins, the opposite outermost ones of said connecting pins being respectively located at said two connecting ends of said connecting subunit, another one of said connecting pins being connected between said pivot block portions of said shaft holder; and
said driving plate of each of said compensation subunits of each of said hinge units further has a side protruding portion connected to a respective one of said opposite outermost ones of said connecting pins.

4. The outward-folding display device as claimed in claim 1, wherein:
said driving portion of each of said drive shafts of each of said hinge units has an outer surrounding surface surrounding the shaft axis and having two flat surface sections and a curved surface section that is connected to said flat surface sections; and
said rotating plate of each of said compensation subunits of each of said hinge units further has a sleeve portion formed with a shaft hole that is fittingly engaged with said driving portion of the respective one of said drive shafts for connecting co-rotatably said rotating plate portion and the respective one of said drive shafts together.

5. The outward-folding display device as claimed in claim 4, wherein:
said driving portion of each of said drive shafts of each of said hinge units is disposed between said bushing portions of said shaft holder;
each of said drive shafts further has an extending portion, said syncing portion and said extending portion being connected respectively to opposite ends of said driving portion in the width direction; and
each of said hinge units further includes a plurality of torsion plates, each of which is connected to said extending portions of said drive shafts.

6. The outward-folding display device as claimed in claim 1, wherein:
said driving portion of each of said drive shafts of each of said hinge units is disposed between said bushing portions of said shaft holder;
each of said drive shafts further has an extending portion, said syncing portion and said extending portion being connected respectively to opposite ends of said driving portion in the width direction;
said casing unit further includes a casing board that is connected between said casings, and that is adapted to be connected to the flexible display; and
said outward-folding display device further comprises
a connecting tube extending in the width direction and having one end that is sleeved on said extending portions of said drive shafts of one of said hinge units, and the other end that is sleeved on said extending portions of said drive shafts of the other one of said hinge units, and
a support unit covering said hinge units and said connecting tube, and mounted beneath said casing board for providing consistent support to said casing board during the conversion of said casings.

7. The outward-folding display device as claimed in claim 6, wherein:
said support unit includes
a first steel strip that extends in the width direction and that covers said connecting tube,
two steel plates that extend in the width direction, one of said steel plates covering one of said compensation subunits of one of said hinge units and a respective one of said compensation subunits of the other one of said hinge units which is aligned with the one of said compensation subunits of the one of said hinge units, the other one of said steel plates covering the other one of said compensation subunits of the one of said hinge units and the other one of said compensation subunits of the other one of said hinge units which is aligned with the other one of said compensation subunits of the one of said hinge units,
two second steel strips that extend in the width direction, that are disposed between said steel plates and that flank said first steel strip, and
two connecting boards that extend in the width direction, each of said connecting boards covering a respectively one of said steel plates and a respective one of said casings; and said outward-folding display device further comprises a soft layer disposed beneath said casing board and covering said support unit.

8. The outward-folding display device as claimed in claim 7, wherein said soft layer is made of silicone rubber.

9. The outward-folding display device as claimed in claim 6, further comprising two block boards extending in the width direction and flanking said connecting tube, one of said block boards being connected to said rotating plate of one of said compensation subunits of one of said hinge units and said rotating plate of a respective one of said compensation subunits of the other one of said hinge units which is aligned with the one of said compensation subunits of the one of said hinge units, the other one of said block boards being connected to said rotating plate of the other one of said compensation subunits of the one of said hinge units and the other one of said compensation subunits of the other one of said hinge units which is aligned with the other one of said compensation subunits of the one of said hinge units, said block boards being exposed from a gap between said folding surfaces of said casings when said casings are in the unfolded position.

10. The outward-folding display device as claimed in claim 1, wherein:
said casings includes first and second casings, each of which further has a first edge connected to said hinge units, and a second edge opposite to said first edge, said first and second edges being disposed respectively at opposite sides of said folding surface, said second casing further having
a plurality of cut-out sections, and
a plurality of buffer slots, each having a default end and a buffer end that are opposite to each other, and that are respectively distal from and proximate to said first edge;
said casing unit further includes
a casing board that is connected between said first and second casings and that covers said hinge units, and
a sliding board that cooperates with said first casing and said casing board to define a display surface adapted to be connected to the flexible display and that is slidably mounted to said second casing such that the flexible display is slidable relative to said second casing;
said outward-folding display device further comprises a display protection module including
a plurality of buffer blocks that slidably and respectively engage said buffer slots, and that are connected to said sliding board, and
a plurality of resilient members, each of said resilient members being mounted on a respective one of said cut-out sections, and having opposite ends that are connected respectively to said second casing and said sliding board for biasing said sliding board toward said second edge of said second casing when each of said buffer blocks is moved from said default end toward said buffer end of a respective one of said buffer slots.

11. The outward-folding display device as claimed in claim 10, wherein:
each of said first and second casings includes abase wall having said first and second edges;
said base wall of said second casing is formed with said buffer slots, said buffer slots being arranged along two imaginary parallel lines that are respectively proximate to said first edge and said second edge;

said sliding board is disposed on and slidably connected to said base wall of said second casing; and said base wall of said first casing, said casing board and said sliding board cooperatively define said display surface.

12. The outward-folding display device as claimed in claim 11, wherein said cut-out sections of said second casing are formed in said base wall of said second casing and are disposed between the two imaginary parallel lines.

13. The outward-folding display device as claimed in claim 10, wherein:

said second casing further has a plurality of limiting holes that are respectively in spatial communication with said cut-out sections; and said display protection module further includes a plurality of linking blocks that are disposed respectively in said limiting holes, each of said linking blocks interconnecting a respective one of said resilient members and said sliding board.

\* \* \* \* \*